US009060175B2

(12) United States Patent
Wang et al.

(10) Patent No.: US 9,060,175 B2
(45) Date of Patent: Jun. 16, 2015

(54) SYSTEM AND METHOD FOR MOTION ESTIMATION AND MODE DECISION FOR LOW-COMPLEXITY H.264 DECODER

(75) Inventors: Yong Wang, Xicheng District (CN); Shih-Fu Chang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1206 days.

(21) Appl. No.: 11/846,088

(22) Filed: Aug. 28, 2007

(65) Prior Publication Data

US 2008/0181308 A1    Jul. 31, 2008

Related U.S. Application Data

(63) Continuation of application No. PCT/US2006/007862, filed on Mar. 6, 2006.

(60) Provisional application No. 60/658,440, filed on Mar. 4, 2005.

(51) Int. Cl.
H04N 7/12 (2006.01)
H04N 11/02 (2006.01)
H04N 11/04 (2006.01)
H04N 19/567 (2014.01)
(Continued)

(52) U.S. Cl.
CPC ............ *H04N 19/567* (2014.11); *H04N 19/176* (2014.11); *H04N 19/147* (2014.11); *H04N 19/61* (2014.11); *H04N 19/103* (2014.11); *H04N 19/156* (2014.11); *H04N 19/19* (2014.11)

(58) Field of Classification Search
CPC . H04N 19/103; H04N 19/147; H04N 19/156; H04N 19/176; H04N 19/19
See application file for complete search history.

(56) References Cited

U.S. PATENT DOCUMENTS 4,649,380 A    3/1987 Penna
4,649,482 A    3/1987 Raviv et al.
(Continued)

FOREIGN PATENT DOCUMENTS

EP    0579319    1/1994
EP    0587329    3/1994
(Continued)

OTHER PUBLICATIONS

U.S. Appl. No. 10/482,074, filed Dec. 24, 2003, (Abandoned).
(Continued)

*Primary Examiner* — Nhon Diep
(74) *Attorney, Agent, or Firm* — Baker Botts, LLP

(57) ABSTRACT

The present invention relates to systems and methods for motion estimation and mode decision for low-complexity H.264 standard decoders. The present invention includes a method for optimizing the selection of motion vectors and motion compensation block modules in a video encoder in order to decrease the complexity of the video upon decoding. The novel method of the present invention may include novel steps for selecting motion vectors, block modes, and for applying a complexity-control algorithm to encode the received input video data sequence in accordance with the identified target complexity level. The present invention may be implemented in accordance with current and future video decoding standards to optimize decoding by reducing decoding complexity and thereby reducing required resources and power consumption.

12 Claims, 5 Drawing Sheets

(51) Int. Cl.
  *H04N 19/176* (2014.01)
  *H04N 19/147* (2014.01)
  *H04N 19/61* (2014.01)
  *H04N 19/103* (2014.01)
  *H04N 19/156* (2014.01)
  *H04N 19/19* (2014.01)

(56) References Cited

U.S. PATENT DOCUMENTS

| | | |
|---|---|---|
| 4,712,248 A | 12/1987 | Hongo |
| 5,144,685 A | 9/1992 | Nasar et al. |
| 5,191,645 A | 3/1993 | Carlucci et al. |
| 5,204,706 A | 4/1993 | Saito |
| 5,208,857 A | 5/1993 | Lebrat |
| 5,262,856 A | 11/1993 | Lippman et al. |
| 5,408,274 A | 4/1995 | Chang et al. |
| 5,428,774 A | 6/1995 | Takahashi et al. |
| 5,461,679 A | 10/1995 | Normile et al. |
| 5,465,353 A | 11/1995 | Hull et al. |
| 5,488,664 A | 1/1996 | Shamir |
| 5,493,677 A | 2/1996 | Balogh et al. |
| 5,530,759 A | 6/1996 | Braudaway et al. |
| 5,546,571 A | 8/1996 | Shan et al. |
| 5,546,572 A | 8/1996 | Seto et al. |
| 5,555,354 A | 9/1996 | Strasnick et al. |
| 5,555,378 A | 9/1996 | Gelman et al. |
| 5,557,728 A | 9/1996 | Garrett et al. |
| 5,566,089 A | 10/1996 | Hoogenboom |
| 5,572,260 A | 11/1996 | Onishi et al. |
| 5,579,444 A | 11/1996 | Dalziel et al. |
| 5,579,471 A | 11/1996 | Barber et al. |
| 5,585,852 A | 12/1996 | Agarwal |
| 5,606,655 A | 2/1997 | Arman et al. |
| 5,613,032 A | 3/1997 | Cruz et al. |
| 5,615,112 A | 3/1997 | Liu Sheng et al. |
| 5,617,119 A | 4/1997 | Briggs et al. |
| 5,623,690 A | 4/1997 | Palmer et al. |
| 5,630,121 A | 5/1997 | Braden-Harder et al. |
| 5,642,477 A | 6/1997 | de Carmo et al. |
| 5,655,117 A | 8/1997 | Goldberg et al. |
| 5,664,018 A | 9/1997 | Leighton |
| 5,664,177 A | 9/1997 | Lowry |
| 5,668,897 A | 9/1997 | Stolfo |
| 5,684,715 A | 11/1997 | Palmer |
| 5,694,334 A | 12/1997 | Donahue et al. |
| 5,694,945 A | 12/1997 | Ben-Haim |
| 5,696,964 A | 12/1997 | Cox et al. |
| 5,701,510 A | 12/1997 | Johnson et al. |
| 5,708,805 A | 1/1998 | Okamoto et al. |
| 5,713,021 A | 1/1998 | Kondo et al. |
| 5,721,815 A | 2/1998 | Ottesen et al. |
| 5,724,484 A | 3/1998 | Kagami et al. |
| 5,734,752 A | 3/1998 | Knox |
| 5,734,893 A | 3/1998 | Li et al. |
| 5,742,283 A | 4/1998 | Kim |
| 5,751,286 A | 5/1998 | Barber et al. |
| 5,758,076 A | 5/1998 | Wu et al. |
| 5,767,922 A | 6/1998 | Zabih et al. |
| 5,768,578 A | 6/1998 | Kirk et al. |
| 5,790,703 A | 8/1998 | Wang |
| 5,794,178 A | 8/1998 | Caid et al. |
| 5,794,242 A | 8/1998 | Green et al. |
| 5,802,361 A | 9/1998 | Wang et al. |
| 5,805,733 A | 9/1998 | Wang et al. |
| 5,805,804 A | 9/1998 | Laursen et al. |
| 5,809,139 A | 9/1998 | Girod et al. |
| 5,809,160 A | 9/1998 | Powell et al. |
| 5,821,945 A | 10/1998 | Yeo et al. |
| 5,822,524 A | 10/1998 | Chen et al. |
| 5,825,892 A | 10/1998 | Braudaway et al. |
| 5,848,155 A | 12/1998 | Cox |
| 5,852,435 A | 12/1998 | Vigneaux et al. |
| 5,852,823 A | 12/1998 | De Bonet |
| 5,870,754 A | 2/1999 | Dimitrova et al. |
| 5,873,080 A | 2/1999 | Coden et al. |
| 5,884,298 A | 3/1999 | Smith et al. |
| 5,887,061 A | 3/1999 | Sato |
| 5,893,095 A | 4/1999 | Jain et al. |
| 5,915,027 A | 6/1999 | Cox et al. |
| 5,930,783 A | 7/1999 | Li et al. |
| 5,937,422 A | 8/1999 | Nelson et al. |
| 5,943,422 A | 8/1999 | Van Wie et al. |
| 5,949,885 A | 9/1999 | Leighton |
| 5,960,081 A | 9/1999 | Vynne et al. |
| 5,963,203 A | 10/1999 | Goldberg et al. |
| 5,969,755 A | 10/1999 | Courtney |
| 5,983,218 A | 11/1999 | Syeda-Mahmood |
| 5,987,459 A | 11/1999 | Swanson et al. |
| 5,995,095 A | 11/1999 | Ratakonda |
| 5,995,978 A | 11/1999 | Cullen et al. |
| 6,031,914 A | 2/2000 | Tewfik et al. |
| 6,037,984 A | 3/2000 | Isnardi et al. |
| 6,041,079 A | 3/2000 | Yim |
| 6,047,374 A | 4/2000 | Barton |
| 6,058,186 A | 5/2000 | Enari |
| 6,058,205 A | 5/2000 | Bahl et al. |
| 6,064,764 A | 5/2000 | Bhaskaran et al. |
| 6,070,167 A | 5/2000 | Qian et al. |
| 6,070,228 A | 5/2000 | Belknap et al. |
| 6,072,542 A | 6/2000 | Wilcox et al. |
| 6,075,875 A | 6/2000 | Gu |
| 6,078,664 A | 6/2000 | Moskowitz et al. |
| 6,079,566 A | 6/2000 | Eleftheriadis et al. |
| 6,081,278 A | 6/2000 | Chen |
| 6,092,072 A | 7/2000 | Guha et al. |
| 6,100,930 A | 8/2000 | Kolczynski |
| 6,104,411 A | 8/2000 | Ito et al. |
| 6,108,434 A | 8/2000 | Cox et al. |
| 6,115,717 A | 9/2000 | Mehrotra et al. |
| 6,122,403 A | 9/2000 | Rhoads |
| 6,125,229 A | 9/2000 | Dimitrova et al. |
| 6,141,447 A * | 10/2000 | Linzer et al. .................. 382/236 |
| 6,154,755 A | 11/2000 | Dellert et al. |
| 6,157,745 A | 12/2000 | Salembier |
| 6,157,746 A | 12/2000 | Sodagar et al. |
| 6,167,084 A | 12/2000 | Wang et al. |
| 6,172,675 B1 | 1/2001 | Ahmad et al. |
| 6,178,416 B1 | 1/2001 | Thompson et al. |
| 6,185,329 B1 | 2/2001 | Zhang et al. |
| 6,195,458 B1 | 2/2001 | Warnick et al. |
| 6,208,735 B1 | 3/2001 | Cox et al. |
| 6,208,745 B1 | 3/2001 | Florencio et al. |
| 6,222,932 B1 | 4/2001 | Rao et al. |
| 6,223,183 B1 | 4/2001 | Smith et al. |
| 6,236,395 B1 | 5/2001 | Sezan et al. |
| 6,240,424 B1 | 5/2001 | Hirata |
| 6,243,419 B1 | 6/2001 | Satou et al. |
| 6,246,804 B1 | 6/2001 | Sato et al. |
| 6,252,975 B1 | 6/2001 | Bozdagi et al. |
| 6,269,358 B1 | 7/2001 | Hirata |
| 6,275,599 B1 | 8/2001 | Adler et al. |
| 6,282,299 B1 | 8/2001 | Tewfik et al. |
| 6,282,300 B1 | 8/2001 | Bloom et al. |
| 6,285,995 B1 | 9/2001 | Abdel-Mottaleb et al. |
| 6,297,797 B1 | 10/2001 | Takeuchi et al. |
| 6,327,390 B1 | 12/2001 | Sun et al. |
| 6,332,030 B1 | 12/2001 | Manjunath et al. |
| 6,339,450 B1 | 1/2002 | Chang et al. |
| 6,356,309 B1 | 3/2002 | Masaki et al. |
| 6,360,234 B2 | 3/2002 | Jain et al. |
| 6,366,314 B1 | 4/2002 | Goudezeune et al. |
| 6,366,701 B1 | 4/2002 | Chalom et al. |
| 6,385,329 B1 | 5/2002 | Sharma et al. |
| 6,385,602 B1 | 5/2002 | Tso et al. |
| 6,393,394 B1 | 5/2002 | Ananthapadmanabhan et al. |
| 6,404,925 B1 | 6/2002 | Foote et al. |
| 6,418,232 B1 | 7/2002 | Nakano et al. |
| 6,418,421 B1 | 7/2002 | Hurtado et al. |
| 6,442,538 B1 | 8/2002 | Nojima |
| 6,453,053 B1 | 9/2002 | Wakasu |
| 6,466,940 B1 | 10/2002 | Mills |
| 6,473,459 B1 | 10/2002 | Sugano et al. |
| 6,476,814 B1 | 11/2002 | Garvey |

(56) References Cited

U.S. PATENT DOCUMENTS

| | | |
|---|---|---|
| 6,480,538 B1 * | 11/2002 | Trovato .................... 375/240.01 |
| 6,487,301 B1 | 11/2002 | Zhao |
| 6,499,105 B1 | 12/2002 | Yoshiura et al. |
| 6,526,099 B1 | 2/2003 | Christopoulos et al. |
| 6,532,541 B1 | 3/2003 | Chang et al. |
| 6,546,135 B1 | 4/2003 | Lin et al. |
| 6,549,911 B2 | 4/2003 | Gustman |
| 6,556,695 B1 | 4/2003 | Packer et al. |
| 6,556,958 B1 | 4/2003 | Chickering |
| 6,560,284 B1 | 5/2003 | Girod et al. |
| 6,567,805 B1 | 5/2003 | Johnson et al. |
| 6,581,058 B1 | 6/2003 | Fayyad et al. |
| 6,606,329 B1 | 8/2003 | Herrmann |
| 6,606,393 B1 | 8/2003 | Xie et al. |
| 6,628,824 B1 | 9/2003 | Belanger |
| 6,643,387 B1 | 11/2003 | Sethuraman et al. |
| 6,654,931 B1 | 11/2003 | Haskell et al. |
| 6,678,389 B1 | 1/2004 | Sun et al. |
| 6,683,966 B1 | 1/2004 | Tian et al. |
| 6,687,296 B1 * | 2/2004 | Sato et al. ................ 375/240.12 |
| 6,700,935 B2 | 3/2004 | Lee |
| 6,701,309 B1 | 3/2004 | Beeferman et al. |
| 6,708,055 B2 | 3/2004 | Geiser et al. |
| 6,714,909 B1 | 3/2004 | Gibbon et al. |
| 6,716,175 B2 | 4/2004 | Geiser et al. |
| 6,718,047 B2 | 4/2004 | Rhoads |
| 6,721,733 B2 | 4/2004 | Lipson et al. |
| 6,725,372 B1 | 4/2004 | Lewis et al. |
| 6,735,253 B1 | 5/2004 | Chang et al. |
| 6,741,655 B1 | 5/2004 | Chang et al. |
| 6,757,407 B2 | 6/2004 | Bruckstein et al. |
| 6,778,223 B2 | 8/2004 | Abe |
| 6,792,434 B2 | 9/2004 | Moghaddam et al. |
| 6,807,231 B1 | 10/2004 | Wiegand et al. |
| 6,816,836 B2 | 11/2004 | Basu et al. |
| 6,847,980 B1 | 1/2005 | Benitez et al. |
| 6,879,703 B2 | 4/2005 | Lin et al. |
| 6,886,013 B1 | 4/2005 | Beranek |
| 6,940,910 B2 | 9/2005 | Jun et al. |
| 6,941,325 B1 | 9/2005 | Benitez et al. |
| 6,950,542 B2 | 9/2005 | Roesch |
| 6,970,602 B1 | 11/2005 | Smith et al. |
| 7,010,751 B2 | 3/2006 | Shneiderman |
| 7,072,398 B2 | 7/2006 | Ma |
| 7,093,028 B1 | 8/2006 | Shao et al. |
| 7,103,225 B2 | 9/2006 | Yang et al. |
| 7,143,434 B1 | 11/2006 | Paek et al. |
| 7,145,946 B2 | 12/2006 | Lee |
| 7,154,560 B1 | 12/2006 | Chang et al. |
| 7,184,959 B2 | 2/2007 | Gibbon et al. |
| 7,185,049 B1 | 2/2007 | Benitez et al. |
| 7,254,285 B1 | 8/2007 | Paek et al. |
| 7,308,443 B1 | 12/2007 | Lee et al. |
| 7,313,269 B2 | 12/2007 | Xie et al. |
| 7,327,885 B2 | 2/2008 | Divakaran et al. |
| 7,339,992 B2 | 3/2008 | Chang et al. |
| 7,386,806 B2 | 6/2008 | Wroblewski |
| 7,398,275 B2 | 7/2008 | Rising et al. |
| 7,403,302 B2 | 7/2008 | Gann |
| 7,406,409 B2 | 7/2008 | Otsuka et al. |
| 7,409,144 B2 | 8/2008 | McGrath et al. |
| 7,437,004 B2 | 10/2008 | Baatz et al. |
| 7,496,830 B2 | 2/2009 | Rubin et al. |
| 7,519,217 B2 | 4/2009 | Liu et al. |
| 7,574,409 B2 | 8/2009 | Patinkin |
| 7,624,337 B2 | 11/2009 | Sull et al. |
| 7,636,662 B2 | 12/2009 | Dimtrva et al. |
| 7,653,264 B2 | 1/2010 | Hero et al. |
| 7,653,635 B1 | 1/2010 | Paek et al. |
| 7,676,820 B2 | 3/2010 | Snijder et al. |
| 7,720,851 B2 | 5/2010 | Chang et al. |
| 7,733,956 B1 | 6/2010 | Kalra et al. |
| 7,738,550 B2 | 6/2010 | Kuhn |
| 7,756,338 B2 | 7/2010 | Wilson et al. |
| 7,773,813 B2 | 8/2010 | Hua et al. |
| 7,809,192 B2 | 10/2010 | Gokturk et al. |
| 7,817,722 B2 | 10/2010 | Chang et al. |
| 7,817,855 B2 | 10/2010 | Yuille et al. |
| 7,860,317 B2 | 12/2010 | Xie et al. |
| 7,884,567 B2 | 2/2011 | Kim et al. |
| 7,996,762 B2 | 8/2011 | Qi et al. |
| 8,010,296 B2 | 8/2011 | Loo et al. |
| 8,019,763 B2 | 9/2011 | Wang et al. |
| 8,135,221 B2 | 3/2012 | Jiang et al. |
| 8,145,677 B2 | 3/2012 | Al-Shameri |
| 8,218,617 B2 | 7/2012 | Kim et al. |
| 8,332,333 B2 | 12/2012 | Agarwal |
| 8,520,949 B1 | 8/2013 | Bissacco et al. |
| 2001/0000962 A1 | 5/2001 | Rajan |
| 2002/0021828 A1 | 2/2002 | Papier et al. |
| 2002/0118748 A1 * | 8/2002 | Inomata et al. .......... 375/240.04 |
| 2002/0124104 A1 | 9/2002 | Rappaport et al. |
| 2002/0157116 A1 | 10/2002 | Jasinschi |
| 2002/0169771 A1 | 11/2002 | Melmon et al. |
| 2003/0013951 A1 | 1/2003 | Stefanescu et al. |
| 2003/0046018 A1 | 3/2003 | Kohlmorgen et al. |
| 2003/0195883 A1 | 10/2003 | Mojsilovic et al. |
| 2003/0229278 A1 | 12/2003 | Sinha |
| 2004/0057081 A1 | 3/2004 | Kubota |
| 2004/0131121 A1 | 7/2004 | Dumitras et al. |
| 2004/0210819 A1 | 10/2004 | Alonso |
| 2005/0076055 A1 | 4/2005 | Mory et al. |
| 2005/0201619 A1 | 9/2005 | Sun et al. |
| 2005/0210043 A1 | 9/2005 | Manasse |
| 2005/0238238 A1 | 10/2005 | Xu et al. |
| 2006/0026588 A1 | 2/2006 | Illowsky et al. |
| 2006/0167784 A1 | 7/2006 | Hoffberg |
| 2006/0200260 A1 | 9/2006 | Hoffberg et al. |
| 2006/0206882 A1 | 9/2006 | Illowsky et al. |
| 2006/0224532 A1 | 10/2006 | Duan et al. |
| 2006/0258419 A1 | 11/2006 | Winkler et al. |
| 2006/0293921 A1 | 12/2006 | McCarthy et al. |
| 2007/0033170 A1 | 2/2007 | Sull et al. |
| 2007/0038612 A1 | 2/2007 | Sull et al. |
| 2007/0044010 A1 | 2/2007 | Sull et al. |
| 2007/0047816 A1 | 3/2007 | Graham et al. |
| 2007/0078846 A1 | 4/2007 | Gulli et al. |
| 2007/0087756 A1 | 4/2007 | Hoffberg |
| 2007/0165904 A1 | 7/2007 | Nudd et al. |
| 2007/0174790 A1 | 7/2007 | Jing et al. |
| 2007/0195106 A1 | 8/2007 | Lin et al. |
| 2007/0217676 A1 | 9/2007 | Grauman et al. |
| 2007/0237426 A1 | 10/2007 | Xie et al. |
| 2007/0245400 A1 | 10/2007 | Paek et al. |
| 2008/0055479 A1 | 3/2008 | Shehata et al. |
| 2008/0082426 A1 | 4/2008 | Gokturk et al. |
| 2008/0097939 A1 | 4/2008 | Guyon et al. |
| 2008/0193016 A1 | 8/2008 | Lim et al. |
| 2008/0222670 A1 | 9/2008 | Lee et al. |
| 2008/0266300 A1 | 10/2008 | Deering et al. |
| 2008/0298464 A1 * | 12/2008 | Hinz et al. ............... 375/240.24 |
| 2008/0303942 A1 | 12/2008 | Chang et al. |
| 2008/0304743 A1 | 12/2008 | Tang et al. |
| 2009/0055094 A1 | 2/2009 | Suzuki |
| 2009/0132561 A1 | 5/2009 | Cormode et al. |
| 2009/0290635 A1 | 11/2009 | Kim et al. |
| 2009/0316778 A1 | 12/2009 | Kim et al. |
| 2010/0082614 A1 | 4/2010 | Yang et al. |
| 2010/0172591 A1 | 7/2010 | Ishikawa |
| 2010/0205509 A1 | 8/2010 | Kirschner et al. |
| 2010/0332210 A1 | 12/2010 | Birdwell et al. |
| 2011/0025710 A1 | 2/2011 | Kennedy et al. |
| 2011/0064136 A1 | 3/2011 | Chang et al. |
| 2011/0081892 A1 | 4/2011 | Graham et al. |
| 2011/0093492 A1 | 4/2011 | Sull et al. |
| 2011/0145232 A1 | 6/2011 | Chang et al. |
| 2011/0238698 A1 | 9/2011 | Asikainen et al. |
| 2011/0255605 A1 | 10/2011 | Chang et al. |
| 2011/0283111 A1 | 11/2011 | Bister et al. |
| 2011/0314367 A1 | 12/2011 | Chang et al. |

(56) References Cited

U.S. PATENT DOCUMENTS

| | | |
|---|---|---|
| 2012/0089552 A1 | 4/2012 | Chang et al. |
| 2012/0109858 A1 | 5/2012 | Makadia et al. |
| 2014/0064091 A1 | 3/2014 | Basso et al. |

FOREIGN PATENT DOCUMENTS

| | | |
|---|---|---|
| EP | 0953938 | 11/1999 |
| JP | 2004049471 | 2/1992 |
| JP | 1996317384 | 11/1996 |
| WO | WO98/33323 | 7/1998 |
| WO | WO00/28440 | 5/2000 |
| WO | WO00/49797 | 8/2000 |

OTHER PUBLICATIONS

U.S. Appl. No. 13/078,626, filed Apr. 1, 2011.
U.S. Appl. No. 13/165,553, filed Jun. 21, 2011.
U.S. Appl. No. 09/423,770, filed Nov. 12, 1999, (Abandoned).
U.S. Appl. No. 10/333,030, filed Jun. 6, 2003, (Abandoned).
U.S. Appl. No. 09/623,277, filed Sep. 1, 2000, (Abandoned).
U.S. Appl. No. 10/149,685, filed Jun. 13, 2002, (Abandoned).
U.S. Appl. No. 09/359,836, filed Jul. 23, 1999, (Abandoned).
U.S. Appl. No. 10/491,460, filed Apr. 1, 2004, (Abandoned).
U.S. Appl. No. 11/506,060, filed Aug. 16, 2006, (Abandoned).
U.S. Appl. No. 10/482,074, filed Jun. 18, 2008 Notice of Abandonment.
U.S. Appl. No. 10/482,074, filed Nov. 14, 2007 Non-Final Office Action.
U.S. Appl. No. 10/965,040, filed Aug. 10, 2011 Advisory Action.
U.S. Appl. No. 10/965,040, filed Aug. 2, 2011 Response to Final Office Action.
U.S. Appl. No. 10/965,040, filed May 13, 2011 Final Office Action.
U.S. Appl. No. 10/965,040, filed Feb. 25, 2011 Response to Non-Final Office Action.
U.S. Appl. No. 10/965,040, filed Oct. 29, 2010 Non-Final Office Action.
U.S. Appl. No. 11/448,114, filed Jul. 8, 2011 Non-Final Office Action.
U.S. Appl. No. 11/448,114, filed Apr. 27, 2011 Response to Non-Final Office Action.
U.S. Appl. No. 11/448,114, filed Oct. 28, 2010 Non-Final Office Action.
U.S. Appl. No. 11/448,114, filed Apr. 1, 2010 Amendment and Request for Continued Examination (RCE).
U.S. Appl. No. 11/448,114, filed Nov. 25, 2009 Final Office Action.
U.S. Appl. No. 11/448,114, filed Oct. 19, 2009 Response to Non-Compliant Response.
U.S. Appl. No. 11/448,114, filed Oct. 6, 2009 Notice of Non-Compliant Response.
U.S. Appl. No. 11/448,114, filed Aug. 12, 2009 Response to Non-Final Office Action.
U.S. Appl. No. 11/448,114, filed Mar. 16, 2009 Non-Final Office Action.
U.S. Appl. No. 09/423,770, filed Feb. 20, 2004 Notice of Abandonment.
U.S. Appl. No. 09/423,770, filed Jul. 2, 2003 Non-Final Office Action.
U.S. Appl. No. 10/333,030, filed Jun. 25, 2010 Notice of Abandonment.
U.S. Appl. No. 10/333,030, filed Sep. 22, 2009 Non-Final Office Action.
U.S. Appl. No. 10/333,030, filed Jul. 9, 2009 Amendment and Request for Continued Examination (RCE).
U.S. Appl. No. 10/333,030, filed Feb. 26, 2009 Final Office Action.
U.S. Appl. No. 10/333,030, filed Nov. 21, 2008 Response to Non-Final Office Action.
U.S. Appl. No. 10/333,030, filed May 22, 2008 Non-Final Office Action.
U.S. Appl. No. 10/333,030, filed Apr. 15, 2008 Supplemental Response to Notice of Non-Compliant.
U.S. Appl. No. 10/333,030, filed Apr. 10, 2008 Response to Notice of Non-Compliant.
U.S. Appl. No. 10/333,030, filed Feb. 15, 2008 Notice of Non-Compliant.
U.S. Appl. No. 10/333,030, filed Jan. 24, 2008 Amendment and Request for Continued Examination (RCE).
U.S. Appl. No. 10/333,030, filed Oct. 25, 2007 Final Office Action.
U.S. Appl. No. 10/333,030, filed Aug. 28, 2007 Response to Non-Final Office Action.
U.S. Appl. No. 10/333,030, filed Apr. 30, 2007 Non-Final Office Action.
U.S. Appl. No. 10/333,030, filed Mar. 20, 2007 Response to Non-Final Office Action.
U.S. Appl. No. 10/333,030, filed Dec. 20, 2006 Non-Final Office Action.
U.S. Appl. No. 09/423,409, filed Nov. 21, 2003 Notice of Allowance.
U.S. Appl. No. 09/423,409, filed Nov. 6, 2003 Response to Final Office Action.
U.S. Appl. No. 09/423,409, filed Aug. 7, 2003 Final Office Action.
U.S. Appl. No. 09/423,409, filed Jun. 2, 2003 Response to Non-Final Office Action.
U.S. Appl. No. 09/423,409, filed Dec. 10, 2002 Non-Final Office Action.
U.S. Appl. No. 09/623,277, filed Mar. 23, 2006 Notice of Abandonment.
U.S. Appl. No. 09/623,277, filed Aug. 10, 2005 Restriction Requirement.
U.S. Appl. No. 09/607,974, filed Jul. 9, 2004 Notice of Allowance.
U.S. Appl. No. 09/607,974, filed Apr. 26, 2004 Response to Non-Final Office Action.
U.S. Appl. No. 09/607,974, filed Dec. 11, 2003 Non-Final Office Action.
U.S. Appl. No. 09/607,974, filed Nov. 10, 2003 Request for Continued Examination (RCE).
U.S. Appl. No. 09/607,974, filed Sep. 3, 2003 Advisory Action.
U.S. Appl. No. 09/607,974, filed Jul. 30, 2003 Response to Final Office Action.
U.S. Appl. No. 09/607,974, filed May 9, 2003 Final Office Action.
U.S. Appl. No. 09/607,974, filed Apr. 4, 2003 Response to Notice of Informality or Non-Responsive Amendment.
U.S. Appl. No. 09/607,974, filed Feb. 24, 2003 Notice of Informal or Non-Responsive Amendment.
U.S. Appl. No. 09/607,974, filed Jan. 8, 2003 Response to Non-Final Office Action.
U.S. Appl. No. 09/607,974, filed Jul. 1, 2002 Non-Final Office Action.
U.S. Appl. No. 09/530,308, filed Apr. 20, 2006 Notice of Allowance.
U.S. Appl. No. 09/530,308, filed Jan. 23, 2006 Response to Non-Final Office Action.
U.S. Appl. No. 09/530,308, filed Oct. 20, 2005 Non-Final Office Action.
U.S. Appl. No. 09/530,308, filed Jul. 11, 2005 filed Appeal Brief.
U.S. Appl. No. 09/530,308, filed May 12, 2005 filed Notice of Appeal.
U.S. Appl. No. 09/530,308, filed Feb. 9, 2005 Final Office Action.
U.S. Appl. No. 09/530,308, filed Sep. 27, 2004 Response to Non-Final Office Action.
U.S. Appl. No. 09/530,308, filed Mar. 24, 2004 Non-Final Office Action.
U.S. Appl. No. 09/530,308, filed Jan. 12, 2004 Response to Non-Final Office Action.
U.S. Appl. No. 09/530,308, filed Oct. 2, 2003 Non-Final Office Action.
U.S. Appl. No. 09/530,308, filed Jul. 14, 2003 Response to Non-Final Office Action.
U.S. Appl. No. 09/530,308, filed Nov. 20, 2002 Non-Final Office Action.
U.S. Appl. No. 10/220,776, filed Aug. 23, 2004 Notice of Allowance.
U.S. Appl. No. 10/149,685, filed Feb. 7, 2008 Notice of Abandonment.
U.S. Appl. No. 10/149,685, filed Jul. 31, 2007 Non-Final Office Action.

(56) References Cited

OTHER PUBLICATIONS

U.S. Appl. No. 10/149,685, filed May 7, 2007 Response to Non-Final Office Action.
U.S. Appl. No. 10/149,685, filed Feb. 6, 2007 Non-Final Office Action.
U.S. Appl. No. 09/889,859, filed Mar. 22, 2004 Notice of Allowance.
U.S. Appl. No. 09/889,859, filed Jan. 12, 2004 Response to Non-Final Office Action.
U.S. Appl. No. 09/889,859, filed Sep. 10, 2003 Non-Final Office Action.
U.S. Appl. No. 09/359,836, filed Mar. 17, 2008 Notice of Abandonment.
U.S. Appl. No. 09/359,836, filed Aug. 10, 2007 Final Office Action.
U.S. Appl. No. 09/359,836, filed May 11, 2007 Response to Non-Final Office Action.
U.S. Appl. No. 09/359,836, filed Dec. 15, 2006 Non-Final Office Action.
U.S. Appl. No. 09/359,836, filed Sep. 21, 2006 Amendment and Request for Continued Examination (RCE).
U.S. Appl. No. 09/359,836, filed May 18, 2004 Final Office Action.
U.S. Appl. No. 09/359,836, filed Mar. 5, 2004 Response to Non-Final Office Action.
U.S. Appl. No. 09/359,836, filed Aug. 29, 2003 Non-Final Office Action.
U.S. Appl. No. 09/830,899, filed Nov. 4, 2009 Notice of Allowance.
U.S. Appl. No. 09/830,899, filed Oct. 1, 2009 Request for Continued Examination (RCE).
U.S. Appl. No. 09/830,899, filed Sep. 4, 2009 Notice of Allowance.
U.S. Appl. No. 09/830,899, filed Jun. 29, 2009 Response to Non-Final Office Action.
U.S. Appl. No. 09/830,899, filed Feb. 2, 2009 Non-Final Office Action.
U.S. Appl. No. 09/830,899, filed Dec. 22, 2008 Response to Non-Final Office Action.
U.S. Appl. No. 09/830,899, filed Oct. 9, 2008 Non-Final Office Action.
U.S. Appl. No. 09/830,899, filed Jul. 15, 2008 Amendment and Request for Continued Examination.
U.S. Appl. No. 09/830,899, filed May 16, 2007 filed Reply Brief.
U.S. Appl. No. 09/830,899, filed Apr. 5, 2007 Examiner's Answer to Appeal Brief.
U.S. Appl. No. 09/830,899, filed Dec. 18, 2006 filed Appeal Brief.
U.S. Appl. No. 09/830,899, filed Nov. 3, 2006 filed Notice of Appeal.
U.S. Appl. No. 09/830,899, filed Jul. 3, 2006 Final Office Action and Examiner Interview Summary.
U.S. Appl. No. 09/830,899, filed Apr. 13, 2006 Non-Final Office Action.
U.S. Appl. No. 09/830,899, filed Mar. 3, 2006 filed Appeal Brief.
U.S. Appl. No. 09/830,899, filed Feb. 15, 2006 Notice of Defective Appeal Brief.
U.S. Appl. No. 09/830,899, filed Dec. 19, 2005 filed Appeal Brief.
U.S. Appl. No. 09/830,899, filed Nov. 9, 2005 Pre-Appeal Brief Conference Decision.
U.S. Appl. No. 09/830,899, filed Oct. 17, 2005 Amendment, Notice of Appeal and Pre-Appeal Brief Request.
U.S. Appl. No. 09/830,899, filed Jul. 5, 2005 Final Office Action.
U.S. Appl. No. 09/830,899, filed Dec. 27, 2004 Response to Notice of Non-Compliant.
U.S. Appl. No. 09/830,899, filed Dec. 7, 2004 Notice of Non-Compliant.
U.S. Appl. No. 09/830,899, filed Jul. 6, 2004 Amendment and Request for Continued Examination (RCE).
U.S. Appl. No. 09/830,899, filed Mar. 12, 2004 Final Office Action.
U.S. Appl. No. 09/830,899, filed Dec. 11, 2003 Response to Non-Final Office Action.
U.S. Appl. No. 09/830,899, filed Aug. 13, 2003 Non-Final Office Action.
U.S. Appl. No. 10/491,460, filed Jul. 11, 2006 Notice of Abandonment.
U.S. Appl. No. 10/728,345, filed Jun. 15, 2010 Notice of Allowance.
U.S. Appl. No. 10/728,345, filed Mar. 10, 2010 Response to Non-Final Office Action.
U.S. Appl. No. 10/728,345, filed Dec. 24, 2009 Non-Final Office Action.
U.S. Appl. No. 10/728,345, filed Oct. 5, 2009 Amendment and Request for Continued Examination (RCE).
U.S. Appl. No. 10/728,345, filed Jul. 9, 2009 Final Office Action.
U.S. Appl. No. 10/728,345, filed Apr. 9, 2009 Response to Non-Final Office Action.
U.S. Appl. No. 10/728,345, filed Dec. 10, 2008 Non-Final Office Action.
U.S. Appl. No. 10/728,345, filed Sep. 30, 2008 Response to Non-Final Office Action.
U.S. Appl. No. 10/728,345, filed Jun. 30, 2008 Non-Final Office Action.
U.S. Appl. No. 10/494,739, filed Oct. 10, 2007 Notice of Allowance.
U.S. Appl. No. 09/831,215, filed Sep. 6, 2006 Notice of Allowance.
U.S. Appl. No. 09/235,862, filed Oct. 25, 2002 Notice of Allowance.
U.S. Appl. No. 09/235,862, filed Oct. 21, 2002 Supplemental Response to Final Office Action.
U.S. Appl. No. 09/235,862, filed Oct. 10, 2002 Advisory Action.
U.S. Appl. No. 09/235,862, filed Sep. 30, 2002 Response to Final Office Action.
U.S. Appl. No. 09/235,862, filed Apr. 22, 2002 Final Office Action.
U.S. Appl. No. 09/235,862, filed Mar. 12, 2002 Response to Non-Final Office Action.
U.S. Appl. No. 09/235,862, filed Nov. 7, 2001 Non-Final Office Action.
U.S. Appl. No. 09/831,218, filed Mar. 1, 2006 Notice of Allowance.
U.S. Appl. No. 09/831,218, filed Feb. 10, 2006 Response to Final Office Action.
U.S. Appl. No. 09/831,218, filed Dec. 29, 2005 Final Office Action.
U.S. Appl. No. 09/831,218, filed Nov. 28, 2005 Response to Non-Final Office Action.
U.S. Appl. No. 09/831,218, filed Aug. 24, 2005 Non-Final Office Action.
U.S. Appl. No. 11/506,060, filed May 10, 2011 Final Office Action.
U.S. Appl. No. 11/506,060, filed Apr. 12, 2011 Response to Non-Final Office Action.
U.S. Appl. No. 11/506,060, filed Oct. 19, 2010 Non-Final Office Action.
U.S. Appl. No. 11/506,060, filed Mar. 3, 2010 Amendment and Request for Continued Examination (RCE).
U.S. Appl. No. 11/506,060, filed Nov. 18, 2009 Final Office Action.
U.S. Appl. No. 11/506,060, Aug. 13, 2009 Response to Non-Final Office Action.
U.S. Appl. No. 11/506,060, Mar. 11, 2009 Non-Final Office Action.
Infotouch: An Explorative Multi-Touch Interface for Tagged Photo Collections. Linkoping University. Purportedly posted to Youtube on May 31, 2007 (http://www.youtube.com/watch?v=DHMJJwouq51). p. 1.
Zavesky et al., "Low-Latency Query Formulation and Result Exploration for Concept-Based Visual Search,", ACM Multimedia Information Retrieval Conference, Oct. 2008, Vancouver, Canada; pp. 1-23.
Dimitrova et al., "Motion Recovery for Video Contect Classification,", Arizona State University, Temple; Transactions on Information Systems; Oct. 13, 1995; No. 4, pp. 408-439; New York, NY, U.S.A.
Chang et al., "Multimedia Search and Retrieval", Published as a chapter in Advances in Multimedia: System, Standard, and Networks, A. Puri and T. Chen (eds.). New York: Marcel Dekker, 1999; pp. 559-584.
M. Bierling, "Displacement Estimation by Hierarchical Block Matching", SPIE Visual Commun. & Image Processing (1988) vol. 1001; pp. 942-951.
Hirata et al., "Query by Visual Example, Content Based Image Retrieval, Advances in Database Technology—EDBT"; Lecture Notes in Computer Science (1992, A. Pirotte et al. eds.)vol. 580; pp. 56-71.
T. Minka, "An Image Database Browed that Learns from User Interaction" MIT Media Laboratory Perceptual Computing Section, TR#365 (1996); pp. 1-55.

(56) References Cited

OTHER PUBLICATIONS

W. Niblack et al. "The QBIC Project: Querying Images by Content Using Color, Texture and Shape" in Storage and Retrieval for Image and Video Databases, Wayne Niblack, Editor, Proc. SPIE 1908, pp. 173-181 (1993).
Saber et al., "Region-based shape matching for automatic image annotation and query-by-example" 8 Visual Comm. and Image Representation (1997) pp. 1-40.
Sun, et al., "Architectures for MPEG Compressed Bitstream Scaling." Transactions on Circuits and Systems for Video Technology, vol. 6(2), Apr. 1996.
MPEG-7 Requirements; Oct. 1998.
MPEG-7 Context and Objectives; Oct. 1998.
MPEG-7 Proposal Package Description; Oct. 1998.
Oomoto E et al: "OVID: design and implementation of a video-object database system" IEEE Transactions on Knowledge and Data Engineering, IEEE, Inc. New York, US, vol. 5, No. 4, Aug. 1993, pp. 629-643, XP002134326 ISSN: 1041-4347.
Chung-Sheng Li et al: "Multimedia content descriptioin in the InfoPyramid" Acoustics, Speech and Signal Processing, 1998. Porceedings of the 1998 IEEE International Conference on Seattle, WA, USA May 12-15, 1998, New York, NY USA, IEEE, US, May 12, 1998, pp. 3789-3792, XP010279595 ISBN: 0-7803-4428-6.
Sato et al., "Video OCR: Indexing digital news libraries by recognition of superimposed captions", Multimedia Systems, 7:385-394, 1999.
Trier et al.m "Feature extraction methods for character recognition-A survey", Pattern Recognition, vol. 29, pp. 641-662, 1996.
Tse et al., "Global Zoom/Pan estimation and compensation for video compression" Proceedings of ICASSP 1991, pp. 2725-2728.
Zhong et al., "Structure analysis of sports video using domain models", IEEE International Conference on Multimedia and Expo., Aug. 22-25, 2001, Tokyo, Japan.
Akutsu et al., "Video indexing using motion vectors", SPIE Visual communications and Image Processing 1992, vol. 1818, pp. 1522-1530.
Arman et al., "Image processing on compressed data for large video databases", Proceedings of ACM Multimedia '93, Jun. 1993, pp. 267-272.
Smoliar et al., "Content-Based video indexing and Retrieval", IEEE Mulitmedia, Summer 1994, pp. 62-72.
Sawhney et al., "Model-Based 2D & 3D Dominant Motion Estimation of Mosaicking and Video Representation" Proc. Fifth Int'l Conf. Computer Vision, Los Alamitos, CA, 1995, pp. 583-590.
Yeung et al., "Video Browsing using clustering and scene transitions on compressed sequences" IS & T/SPIE Symposium Proceedings, Feb. 1995, vol. 2417, pp. 399-413.
Meng et al., " Scene change detection in a MPEG Compressed video Sequence" IS & T/SPIE Symposium proceedings, vol. 2419, Feb. 1995.
Zhong et al., "Clustering methods for video browsing and annotation" sotrage and retrieval for Still Image and Video Databases IV, IS&T/SPIE's electronic Images: science & Tech. 96, vol. 2670 (1996).
Shahraray, B. "Scene Change Detecton and Content-Based sampling of video Sequences" SPIE conf. Digital Image Compression: Algorithms and Technologies 1995, vol. 2419.
Leung et al., "Picture Retrieval by Content description", Journal of Information Science; No. 18, pp. 111-119, 1992.
Meng et al., "Tools for Compressed-Domain Video Indexing and Editing", SPIE conference on storage and retrieval for Image and video Database, vol. 2670 (1996).
Li et al., "Modeling of moving objects in a video database", Proceeding of IEEE International Conference on Multimedia Computing and systems, pp. 336-343; Jun. 1997.
Li et al., "Modeling video temporal relationships in an object database management system", IS&T/SPIE international Symposium on Electronic Imaging: Multimedia Computing and Networking, pp. 80-91, Feb. 1997.
Oria et al., "Modeling images for content-based queried: the DISIMA Approach", Second international Conference on Visual Information Systems, pp. 339-346: Jun. 1997.
Lin et al., "A Robust image authentication Method surviving JPEG lossy compression"; SPIE 1998; pp. 28-30.
Lin et al., "A Robust image authentication Method distinguishin JPEG compression form malicious manipulation"; CU/CRT Technical Report 486-97-119, Dec. 1997; pp. 1-43.
Walton, Steven, "Image authentication for a slippery new age, knowing when images have been changed", Dr. Dobb's 1995.
Schneider et al., "A Robust content based digital sugnature for image authentication", Columbia University, Image and Advanced Television Laboratory, NY; 1996; pp. 227-230.
Li et al., "Issues and solutions for authenticating MPEG video", Columbia University, Department of Electrical Engineering, NY, Jan. 1999; pp. 54-65.
Kliot et al., "Invariant-Based shape retrieval in pictorial databases", Computer Vision and Image Understanding; Aug. 1998; 71(2): 182-197.
Schmid et al., "Local grayvalue invariants for image retrieval" IEEE Transaction on Pattern Analysis and Machine Intelligence; May 1997; 19(5): 530-535.v.
Cox et al., "Secure spread spectrum watermaking for multimedia", NEC Research Institute, Technical Report 95-10, Dec. 4, 1995; pp. 1 of 1 and 1-33.
Jacobs et al., "Fast Multiresolution Image Querying," Proc of SIGGRAPH, Los Angeles (Aug. 1995) pp. 277-286.
Kato et al., "Sketch Retrieval Method for Full Color Image Database—Query by Visual Example," Electro Technical Laboratory, MIDI, Tsukuba 305, Japan, IEEE (1992) pp. 530-532.
Netravali et al., Digital Pictures: Representation, Compression, and Standards, 2d. Ed., Plenum Press, New York and London (1995) pp. 340-344.
Del Bimbo et al., "Visual Image Retrieval by Elastic Matching of User Sketches," 19 IEEE Trans. on PAMI (1997) pp. 121-123.
Tong et al., "RUBRIC—An Environment for Full Text Information Retrieval," ACM, Jun. 1985, pp. 243-251.
Hjelsvold et al., "Searching and Browsing a Shared Video Database," IEEE, Aug. 1995, pp. 90-98.
Chabane Djeraba and Marinette Bouet "Digital Information Retrieval," Copyright 1997 ACM 0-89791-970-x/97/11 pp. 185-192.
Gong et al. (1995) "Automatic Parsing of TV Soccer Programs," IEEE, pp. 167-174.
John R. Smith (1999) "Digital Video Libraries and the Internet," IEEE, pp. 92-97.
Tonomura et al. (1990) "Content Oriented Visual Interface Using Video Icons for Visual Database Systems," Journal of Visual Languages and Computing, pp. 183-198.
Gunsel et al. (1998) "Temporal Video Segmentation Using Unsupervised Clustering and Semantic Object Tracking," Journal of Electronic Imaging 7(3), pp. 592-604.
Yoshinobu Tonomura (1991) "Video Handling Based on Structured Information for Hypermedia Systems," Proceedings of the International Conference on Multimedia Information Systems, pp. 333-344.
AMOS: An Active System for MPEG-4 Video Object Segmentation, Di Zhong and Shih-Chang, 647-651, o-8186-8821-1/98 (c) 1998 IEEE.
Gong Y. et al. A Generic Video Parsing System with a Scene Description Language (SDL). Real-Time Imaging, Feb. 1996, vol. 2, No. 1, pp. 45-49.
Russ, John C. The Image Processing Handbook. Boca Raton, Florida: CRC Press. 1995, 2nd ed., pp. 361-376.
Chang, S.-F. et al. VideoQ: An Automated Content-Based Video Search System Using Visual Cues. Proceedings ACM Multimedia 97, Seattle, WA, Nov. 9-13, 1997, pp. 313-324.
Chang, S.-F. Content-Based Indexing and Retrieval of Visual Information. IEEE Signal Processing Magazine. Jul. 1997, vol. 14, No. 4, pp. 45-48.
Li, W. et al. Vision: A Digital Video Library, Proceedings of the 1st ACM International Conference on Digital Libraries, Bethesda, MD, Mar. 20-23, 1996, pp. 19-27.
International Search Report PCT/US09/047492, Aug. 27, 2009.
International Search Report PCT/US09/40029, May 29, 2009.

(56) References Cited

OTHER PUBLICATIONS

International Search Report PCT/US99/26125, Apr. 3, 2000.
International Search Report PCT/US02/39247, Dec. 12, 2003.
International Search Report PCT/US00/34803, Oct. 29, 2001.
International Search Report PCT/US99/26126, May 10, 2000.
International Search Report PCT/US02/16599, Nov. 22, 2002.
International Search Report PCT/US02/31488, Feb. 4, 2003.
International Search Report PCT/US99/26127, Apr. 6, 2000.
International Search Report PCT/US10/023494, Apr. 1, 2000.
International Search Report PCT/US99/04776, May 14, 1999.
International Search Report PCT/US04/28722, Jun. 1, 2005.
International Search Report PCT/US06/007862, Mar. 29, 2007.
International Search Report PCT/US00/02488, May 25, 2000.
International Search Report PCT/US00/018231, Oct. 4, 2000.
International Search Report PCT/US09/069237, Mar. 1, 2010.
International Search Report PCT/US99/022790, Feb. 24, 1999.
International Search Report PCT/US99/22264, Feb. 11, 2000.
International Search Report PCT/US01/22485, May 11, 2003.
International Search Report PCT/US98/09124, Oct. 8, 1998.
International Search Report PCT/US03/12858, Nov. 25, 2003.
Geiger et al., "Dynamic Programming for Detecting, Tracking, and Matching Deformable Contours" IEEE Transactions on Pattern Analysis and Machine Intelligence, 17(3): 294-302, Mar. 1, 1995, XP000498121 Abstract.
Wang, et al. "Dynamic rate scaling of coded digital video for IVOD applications." Transactions on Consumer Electronics, vol. 44(3), Aug. 1998, pp. 743-749.
Wee, et al., "Field-to-frame transcoding with spatial and temporal downsampling." Proceedings of the 1999 International Conference on Image Processing, vol. 4, Oct. 1999.
Wee, et al., "Secure scalable streaming enabling transcoding without decryption." Proceedings of the 2001 International Conference on Image Processing, vol. 1 of 3, Oct. 2001.
Wee, et al., "Secure scalable video streaming for wireless networks." Proceedings of the 2001 IEEE International Conference on Acoustics, Speech, and Signal Process, vol. 4 of 6, May 2001, pp. 2049-2052.
Sorial, et al., "Selective requantization for transcoding of MPEG compressed video." Proceedings of the 2000 IEEE International Conference on Multimrdia and Expo, vol. 1, 2000, pp. 217-220.
Kim, et al., "Description of Utility function based on optimum transcoding" ISO/IECJTC1/SC/ WG11 MPEG02/M8319, Apr. 2002.
Mukherjee, et al., "Structured scalable meta-formsats (SSM) for digital item adaptation" Proceedings of the SPIE, SPIE, Bellingham, VA, US, vol. 5018, Jan. 2003, pp. 148-167.
Friedman, G.L., "The Trustworthy Digital Camera: Restoring Credibility to the Photographic Image", IEEE Transactions on Consumer Electronics, 39(4): 905-910; Nov. 1, 1993, XP000423080.
Lee et al., A Watermarking Sequence Using Parities of Error Control Coding for Image Authentication and Correction, IEEE Transaction on Sonsumer electronics, 46(2): 313-317, May 2000, XP00110026.
Tuong Dao, IEEE Proceedings, ISBN: 0-8186-8464-X; pp. 88-97, especially pp. 88-90.
Sajda et al., "In a blink of an eye and a switch of a transistor: Cortically-cuopled computer vision", Journal of Latex Class Files, Jan. 2007, 6(1): 1-14.
Wang et a, "Columbia TAG System—Transductive Annotation by Graph Version 1.0", Columbia University ADVENT Technical Report #225-2008-3, Oct. 15, 2008, entire document.
Bayram et al.: "Image Manipulation Detection,", Journal of Electronic Imaging 15(4), 041102, (Oct.-Dec. 2006).
Fridich et al.: "Detection of Copy-Move Forgery in Digital Images", Proc. of DFRWS 2003, Cleveland, OH, USA, Aug. 5-8, 2003.
U.S. Appl. No. 11/448,114, filed May 16, 2012 Notice of Appeal.
U.S. Appl. No. 11/615,120, filed Apr. 6, 2010 Issue Fee payment.
U.S. Appl. No. 11/615,120, filed Jan. 14, 2010 Notice of Allowance.
U.S. Appl. No. 11/615,120, filed Sep. 4, 2009 Response to Non-Final Office Action.
U.S. Appl. No. 11/615,120, filed May 4, 2009 Non-Final Office Action.
U.S. Appl. No. 12/574,716, filed Feb. 1, 2012 Issue Fee payment.
U.S. Appl. No. 12/574,716, filed Nov. 10, 2011 Notice of Allowance.
U.S. Appl. No. 10/965,040, filed Mar. 15, 2012 Notice of Allowance.
Amir et al., "IBM research TRECVID-2003 video retrieval system", Proc. NIST Text Retrieval Conf. (TREC), 2003.
Anemueller et al., "Biologically motivated audio-visual cue integration for object categorization", Proc. International Conference on Cognitive Systems, 2008.
Barzelay et al., "Harmony in motion", Proc. IEEE Conference Computer Vision and Pattern Recognition, pp. 1-8, 2007.
Beal at al., "A graphical model for audiovisual object tracking", IEEE Trans. Pattern Analysis and Machine Intelligence, 25:828-836, 2003.
Chang et al., "Large-scale multimodal semantic concept detection for consumer video", Proc. 9th ACM SIGMM International Workshop on Multimedia Information Retrieval, 2007.
Chen et al., "Image categorization by learning and reasoning with regions", Journal of Machine Learning Research, 5:913-939, 2004.
Cristani et al., "Audio-visual event recognition in surveillance video sequences", IEEE Trans. Multimedia, 9:257-267, 2007.
Dalal et al., "Histograms of oriented gradients for human detection", Proc. IEEE Conference Computer Vision and Pattern Recognition, pp. 886-893, 2005.
Deng et al., "Unsupervised segmentation of color-texture regions in images and video", IEEE Trans. Pattern Analysis and Machine Intelligence, 23:800-810, 2001.
Friedman, et al., "Additive logistic regression: a statistical view of boosting", Annals of Statistics, 28:337-407, 2000.
Han et al. "Incremental density approximation and kernel-based bayesian filtering for object tracking", Proc. IEEE Conference Computer Vision and Pattern Recognition, pp. 638-644, 2004.
Hellman et al., "Probability of error, equivocation, and the chernoff bound", IEEE Trans. on Information Theory, 16(4):368-372, 1970.
Hershey et al., "Audio-vision: using audio-visual synchrony to locate sounds", Proc. Advances in Neural Information Processing Systems, 1999.
Iwano et al., "Audio-visual speech recognition using lip information extracted from side-face images", EURASIP Journal on Audio, Speech, and Music Processing, 2007.
Lowe "Distinctive image features from scale-invariant keypoints", International Journal of Computer Vision, 60:91-110, 2004.
Lucas, et al. "An iterative image registration technique with an application to stereo vision", Proc. Imaging understanding workshop, pp. 121-130, 1981.
Mallat et al., "Matching pursuits with time-frequency dictionaries", IEEE Transaction on Signal Processing, 41(2): 3397-3415, 1993.
Maron et al., "A framework for multiple-instance learning", Proc. Advances in Neural Information Processing Systems, pp. 570-576, 1998.
Naphade et al., "A factor graph fraemwork for semantic video indexing", IEEE Trans on CSVT, 12(1):40-52, 2002.
Ogle et al., "Fingerprinting to identify repeated sound events in long-duration personal audio recordings", Proc. Int. Conf Acoustics, Speech and Signal Processing, pp. I-233-I-236, 2007.
Pack et al., "Experiments in constructing belief networks for image classification systems", Proc. ICIP, Vancouver, Canada, 2000.
Smith et al., "Multimedia semantic indexing using model vectors", Proc. ICME, 3:445-448, 2003.
Vasconcelos, eature selection by maximum marginal diversity: optimality and implications for visual recognition, CVPR 1:762-769, 2003.
Wang et al., "Learning Semantic Scene Models by Trajectory Analysis", Proc. European Conference on Computer Vision, pp. 110-123, 2006.
Wu, et al., "Multimodal information fusion for video concept detection," Proc. International Conference Image Processing, pp. 2391-2394, 2004.
Yang et al., "Region-based image annotation using asymmetrical support vector machine-based multiple-instance learning", Proc. IEEE Conference Computer Vision and Pattern Recognition, pp. 2057-2063, 2006.

(56) References Cited

OTHER PUBLICATIONS

Zhou et al., "Object tracking using sift features and mean shift," *Computer Vision and Image Understanding*, 113:345-352, 2009.
U.S. Appl. No. 11/448,114, filed Nov. 21, 2011 Final Office Action.
U.S. Appl. No. 10/965,040, filed Nov. 2, 2011 Notice of Appeal.
Gholamhosein et al., "Semantic Clustering and Quering on Heterogeneous Features for Visual Data", *Proceedings of the ACM Multimedia 98, MM '98, Bristol*, Sep. 12-16, 1998, *ACM International Multimedia Conference, New York, NY: ACM*, US, Vol. Conf. 6, Sep. 12, 1998, pp. 3-12, XP000977482.
T. Wiegand, G. J. Sullivan, G. Bjontegaard, A. Luthra, "Overview of the H.264/AVC Video Coding Standard," IEEE Trans. Circuits Syst. Video Technol., vol. 13, pp. 560-576. Jul. 2003.
T. Wedi; H.G. Musmann, Motion- and aliasing-compensated prediction for hybrid video codingPage(s): IEEE Trans. Circuits Syst. Video Technol., vol. 13, pp. 577-586. Jul. 2003.
V. Lappalainen, A. Hallapuro, and T.D. Hamalainen, "Complexity of Optimized H.26L Video Decoder Implementation," IEEE Trans. Circuits Syst. Video Technol., vol. 13, pp. 717-725. Jul. 2003.
A. M. Tourapis, F. Wu, S. Li, "Direct mode coding for bi-predictive pictures in the JVT standard", ISCAS2003, vol. 2, 700-703, Thailand, 2003.
G. J. Sullivan and T. Wiegand, Rate-Distortion Optimization for Video Compression IEEE Signal Processing Magazine, vol. 15, No. 6, pp. 74-90, Nov. 1998.
T. Chiang and Y.-Q. Zhang, "A New Rate Control Scheme Using Quadratic Rate Distortion Model," IEEE Trans. Circuits Syst. Video Technol., vol. 7, pp. 246-250, Feb. 1997.
T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004.
X. Zhou, E. Li, and Y.-K. Chen, "Implementation of H.264 Decoder on General-Purpose Processors with Media Instructions", in Proc. of SPIE Visual Communications and Image Processing, Jan. 2003.
National's PowerWise™ technology. http://www.national.com/appinfo/power/powerwise.html , Nov. 11, 2002.
Y. Eisenberg, C. E. Luna, T. N. Pappas, R. Berry, A.K. Katsaggelos, Joint source coding and transmission power management for energy efficient wireless video communications, CirSysVideo(12), No. 6, Jun. 2002, pp. 411-424.
Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS) 2001, May 2001, Sydney, Australia.
X. Lu, E. Erkip, Y. Wang and D. Goodman, "Power efficient multimedia communication over wireless channels", IEEE Journal on Selected Areas on Communications, Special Issue on Recent Advances in Wireless Multimedia, vol. 21, No. 10, pp. 1738-1751, Dec. 2003.
H. Kim and Y. Altunbasak, "Low-complexity macroblock mode selection for the H.264/AVC encoders," IEEE Int. Conf. on Image Processing, Suntec City, Singapore, Oct. 2004.
A. Ray and H. Radha, "Complexity-Distortion Analysis of H.264/JVT Decoder on Mobile Devices," Picture Coding Symposium (PCS), Dec. 2004.
K. Lengwehasatit and A. Ortega, "Rate Complexity Distortion Optimization for Quadtree-Based DCT Coding",ICIP 2000, Vancouver,BC, Canada, Sep. 2000.
Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.
B. Girod, A. Aaron, S. Rane and D. Rebollo-Monedero , "Distributed video coding," *Proc. of the IEEE*, Special Issue on Video Coding and Delivery, 2005.
A. M. Tourapis. "Enhanced Predictive Zonal Search for Single and Multiple Frame Motion Estimation," Proceedings of Visual Communications and Image Processing 2002 (VCIP-2002), San Jose, CA, Jan. 2002, pp. 1069-1079.
H.-Y. Cheong, A. M. Tourapis, "Fast Motion Estimation within the H.264 codec," in proceedings of ICME-2003, Baltimore, MD, Jul. 6-9, 2003.
M. Schaar, H. Radha, Adaptive motion-compensation fine- granular-scalability (AMC-FGS) for wireless video, IEEE Trans. on CSVT, vol. 12, No. 6, 360-371, 2002.
U.S. Appl. No. 11/448,114, filed Jul. 9, 2012 Amendment and Request for Examination (RCE).
U.S. Appl. No. 10/965,040, filed Jun. 7, 2012 Issue Fee payment.
U.S. Appl. No. 12/969,101, filed May 24, 2012 Non-Final Office Action.
U.S. Appl. No. 11/960,424, filed Jun. 29, 2012 Non-Final Office Action.
U.S. Appl. No. 11/448,114, filed Jan. 2, 2013 Issue Fee payment.
U.S. Appl. No. 11/448,114, filed Oct. 2, 2012 Notice of Allowance.
U.S. Appl. No. 12/874,337, filed Aug. 23, 2012 Restriction Requirement.
U.S. Appl. No. 12/969,101, filed Dec. 21, 2012 Issue Fee payment.
U.S. Appl. No. 12/969,101, filed Oct. 9, 2012 Notice of Allowance.
U.S. Appl. No. 13/165,553, filed Nov. 23, 2012 Restriction Requirement.
U.S. Appl. No. 11/960,424, filed Dec. 31, 2012 Terminal Disclaimer Decision.
U.S. Appl. No. 11/960,424, filed Dec. 20, 2012 Response to Non-Final Office Action and Terminal Disclaimer filed.
U.S. Appl. No. 12/548,199, filed Feb. 12, 2013 Response to Non-Final Office Action.
U.S. Appl. No. 12/548,199, filed Oct. 16, 2012 Non-Final Office Action.
U.S. Appl. No. 12/861,377, filed Aug. 7, 2013 Response to Restriction Requirement.
U.S. Appl. No. 12/861,377, filed Mar. 13, 2013 Restriction Requirement.
U.S. Appl. No. 12/874,337, filed May 22, 2013 Non-Final Office Action.
U.S. Appl. No. 13/205,044, filed Jul. 19, 2013 Notice of Allowance.
U.S. Appl. No. 13/165,553, filed Jun. 20, 2013 Non-Final Office Action.
U.S. Appl. No. 12/548,199, filed Apr. 22, 2013 Final Office Action.
U.S. Appl. No. 11/960,424, filed Jun. 7, 2013 Issue Fee payment.
Belkin, et al., "Manifold Regularization: A Geometric Framework for Learning from Labeled and Unlabeled Examples", *Journal of Machine Learning Research* 7, pp. 2399-2434 (2006).
Ham, et al., "Semisupervised Alignment of Manifolds", *Proceedings of the Annual Conference on Uncertainty in Artificial Intelligence, Z. Ghahramani and R. Cowell, EDS.*, 10: 8 pages (2005).
Huang, et al., "Active Learning for Interactive Multimedia Retrieval", *Proceedings of the IEEE*, 96(4):648-667 (2008).
Zhu, "Semi-Supervised Learning with Graphs", *Canergie Mellon University*, 164 pages (2005).
U.S. Appl. No. 12/874,337, filed Feb. 21, 2013 Response to Restriction Requirement.
U.S. Appl. No. 13/935,183, filed Jul. 3, 2013.
U.S. Appl. No. 13/205,044, filed Oct. 1, 2013 Issue Fee payment.
U.S. Appl. No. 12/548,199, filed Aug. 21, 2013 Amendment and Request for Continued Examination (RCE).
U.S. Appl. No. 13/165,553, filed Sep. 10, 2013 Response to Non-Final Office Action.
U.S. Appl. No. 12/861,377, filed Sep. 24, 2013 Non-Final Office Action.
Bayram, et al., "Image Manipulation Detection with Binary similarity Measures", *Proc. EUSIPCO*, pp. 752-755 (2005).
Lukas, et al., "Detecting Digital Image Forgeries Using Sensor Pattern Noise", *Proc. SPIE, Security, Stenography and Watermarking of Multimedia Contents* VIII, 60720Y, (2006).
Popescu, et al., "Exposing Digital Forgeries by Detecting Traces of Resampling", *IEEE Transactions on signal Processing*, 52(2):758-767 (2005).

\* cited by examiner

FIG. 2

SYSTEM AND METHOD FOR MOTION ESTIMATION AND MODE DECISION FOR LOW-COMPLEXITY H.264 DECODER

CROSS-REFERENCE TO RELATED APPLICATIONS

This application is a continuation of PCT International Application No. PCT/US06/07862 filed Mar. 6 8, 2006 which is based on U.S. provisional patent application No. 60/658,440, filed Mar. 4, 2005, both of which applications are incorporated by reference in their entireties herein, and from which priority is claimed.

BACKGROUND OF THE INVENTION

1. Technical Field

The present invention relates to systems and methods for motion estimation and mode decision for low-complexity H.264 standard encoders/decoders.

2. Background Art

Emerging video coding standards like H.264 achieve significant advances in improving video quality and reducing bandwidth, but generally at the cost of greatly increased computational complexity at both the encoder and the decoder. Playing encoded videos produced by such compression standards requires substantial computational resources and thus results in substantial power consumption. This may be a serious concern in power-sensitive applications, such as handheld devices and other devices used in mobile applications.

Many portable media application devices such as mobile handheld devices are becoming increasingly popular. The computational resources available on these handheld devices is becoming relatively scarce as applications of increasing complexity and number are operated by the devices. Accordingly, there is growing interest in complexity-aware/power-aware video coding solutions.

Most of today's video coding systems encode video bit streams to achieve the best video quality (e.g., the minimal signal distortion) while satisfying certain bitrate constraints. Specifically the following optimization problem formulation is often adopted:

$$\min_P D(P) \text{ s.t., } R(P) \le R_T \qquad (1)$$

where P represents the control variables (CV) which eventually determine the final video quality and bit rate. Typical CVs include quantization parameter (QP), motion vector, motion estimation block mode, etc. D is the distortion introduced by the encoding process. R is the bit rate of the encoded video and $R_T$ is the target bit rate. The solution of the above problem aims at identifying the optimal control variables for each coding unit in order to minimize the average distortion while satisfying the bit rate constraint. Though in practice, some design choices for the control variables may be made based on real-world resource limitations (e.g., memory and computational complexity), Equation (1) does not explicitly model this required complexity in video encoding or decoding. As a matter of fact, many recent advances in coding efficiency are accomplished by using increasingly complex computational modules.

Methods for reducing computational complexity in the prior art include ARMS and National Semiconductor develop a systematic approach called PowerWise technology, which can efficiently reduce the power consumption of mobile multimedia applications through adaptive voltage scaling (AVS). (See National's PowerWise™ technology, described at http://www.national.com/appinfo/power/powerwise.html, which is fully incorporated herein by reference). Zhou et al. implements an H.264 decoder based on Intel's single-instruction-multiple-data (SIMD) architecture that reduces the decoding complexity and improved the H.264 decoding speed by up to three times. (See X. Zhou, E. Li, and Y.-K. Chen, "Implementation of H.264 Decoder on General-Purpose Processors with Media Instructions", in Proc. of SPIE Visual Communications and Image Processing, January 2003, which is fully incorporated herein by reference). Ray and Radha propose a method to reduce the decoding complexity by selectively replacing the I-B-P Group of Pictures (GOP) structure with one using I-P only. (See A. Ray and H. Radha, "Complexity-Distortion Analysis of H.264/JVT Decoder on Mobile Devices," Picture Coding Symposium (PCS), December 2004, which is fully incorporated herein by reference). Lengwehasatit and Ortega developed a method to reduce the decoding complexity by optimizing the Inverse DCT implementation. (See K. Lengwehasatit and A. Ortega, "Rate Complexity Distortion Optimization for Quadtree-Based DCT Coding", ICIP 2000, Vancouver, BC, Canada, September 2000, which is fully incorporated herein by reference). He et al. optimizes the power-rate-distortion performance by constraining the sum of absolute difference (SAD) operations during the motion estimation process at the encoder. (See Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004, which is fully incorporated herein by reference). In addition, power-aware joint source channel coding is also an active topic for mobile wireless video communication. (See Y. Eisenberg, C. E. Luna, T. N. Pappas, R. Berry, A. K. Katsaggelos, Joint source coding and transmission power management for energy efficient wireless video communications, CirSysVideo(12), No. 6, June 2002, pp. 411-424; Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS) 2001, May, 2001, Sydney, Australia; X. Lu, E. Erkip, Y. Wang and D. Goodman, "Power efficient multimedia communication over wireless channels", IEEE Journal on Selected Areas on Communications, Special Issue on Recent Advances in Wireless Multimedia, Vol. 21, No. 10, pp. 1738-1751, December, 2003, all of which are fully incorporated herein by reference). Unlike the conventional paradigm using complex encoding and light decoding, Girod et al. propose a distributed video coding system which transfers the motion estimation process from the encoder to the decoder so that the encoding complexity can be greatly reduced. (See B. Girod, A. Aaron, S. Rane and D. Rebollo-Monedero, "Distributed video coding," Proc. of the IEEE, Special Issue on Video Coding and Delivery, 2005, which is fully incorporated herein by reference).

Furthermore, the computational complexity of each component of a video decoding system varies. Some are relatively constant and independent of the encoded data while others heavily depend on the coding results. For example, the components of inverse quantization and inverse transform have nearly fixed computational cost per coding unit while the motion compensation component has variable complexity depending on the block mode and the type of motion vector. Furthermore, the decoder complexity is dominated by the interpolation filtering process used in motion compensation if the motion vectors are sub-pixel. Other parts of the decoding system, like entropy decoding and inverse transform, do not incur significant computational cost when compared to the interpolation process.

As noted, motion estimation is usually the most computationally complex process since it involves searching over a large range of possible reference locations, each of which may require interpolation filtering. Among the components in the decoding system, the interpolation procedure used in the motion compensation component consumes the most computational resources (about 50%) due to the use of sub-pixel motion vectors. Accordingly, one way to increase power consumption efficiency in video decoding would be to reduce the major computational cost of the motion compensation interpolation procedure.

Many fast motion estimation algorithms have been developed to reduce the motion estimation complexity during encoding. (See A. M. Tourapis. "Enhanced Predictive Zonal Search for Single and Multiple Frame Motion Estimation," Proceedings of Visual Communications and Image Processing 2002 (VCIP-2002), San Jose, Calif., January 2002, pp. 1069-79; H.-Y. Cheong, A. M. Tourapis, "Fast Motion Estimation within the H.264 codec," in proceedings of ICME-2003, Baltimore, Md., Jul. 6-9, 2003, both of which are incorporated herein by reference). Other work proposes scalable methods for motion estimation to control the coding complexity. (See M. Schaar, H. Radha, Adaptive motion-compensation fine-granular-scalability (AMC-FGS) for wireless video, IEEE Trans. on CSVT, vol. 12, no. 6, 360-371, 2002, which is incorporated herein by reference). Nevertheless these methods all focus on the encoding complexity reduction instead of the decoding complexity.

Accordingly, there exists a need in the art for an improved system and method for video encoding/decoding with improved motion estimation which reduces computational costs and power consumption in the decoder.

SUMMARY OF THE INVENTION

The objects of the present invention may be met with a novel system and method for optimizing the selection of the motion vectors and motion compensation block modes in video decoding to reduce the computational cost of decoding while maintaining the desired video quality.

The present invention meets needs in the prior art by providing a system and method for optimizing a video encoder, including the steps of receiving an input video data sequence which includes at least one macroblock, identifying a target complexity level for the video data sequence, determining a Lagrange multiplier for the video data sequence, for each macroblock, calculating at least one motion vector for each block mode based on the determined Lagrange multiplier, for each at least one macroblock, selecting one of the block modes based on the determined Lagrange multiplier, and applying a complexity-control algorithm to encode the received input video data sequence in accordance with the identified target complexity level while maintaining a consistent complexity throughout decoding of the input video data sequence.

In another exemplary embodiment, the present invention provides a system and method for optimizing a video encoder, including the steps of receiving an input video data sequence including one or more macroblocks, for each macroblock, enumerating at least one inter-predictive block mode whose one or more motion vectors are to be calculated based on motion estimation, for each block of each enumerated block mode, selecting the one or more motion vectors that yield minimum rate-distortion-complexity, and storing the selected one or more motion vectors for each block of each enumerated block mode.

In another exemplary embodiment, the present invention provides a system and method for optimizing a video encoder, including the steps of receiving an input video data sequence including one or more macroblocks, identifying one or more possible block modes for each macroblock, retrieving one or more selected motion vectors for each block mode, using the selected motion vectors, calculating the rate-distortion-complexity cost for each block mode, selecting, for each macroblock, a block mode that yields a minimum rate-distortion-complexity cost function, and storing at least one of the selected block modes for further processing.

The accompanying drawings, which are incorporated and constitute part of this disclosure, illustrate preferred embodiments of the invention and serve to explain the principles of the invention.

BRIEF DESCRIPTION OF THE DRAWINGS

FIG. 2 is an exemplary diagram showing sub-pixel locations within a macroblock for exemplary purposes;

Figure 1:
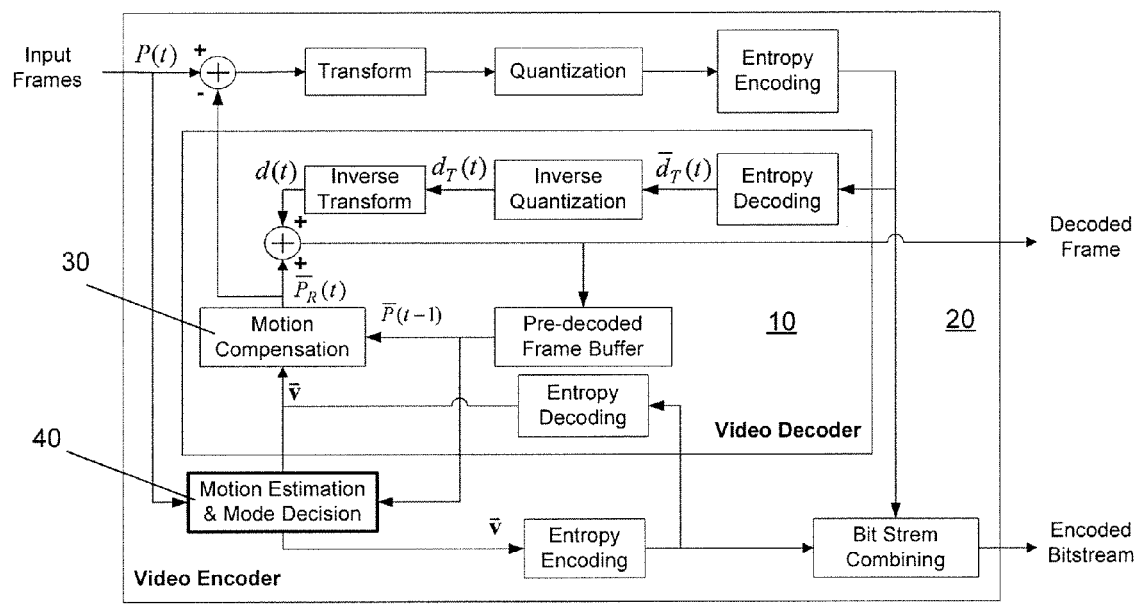
FIG. 1 is a conceptual diagram of an exemplary video coding system.

Throughout the Figures, the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE PREFERRED EMBODIMENTS

The present invention relates to an important aspect of the complexity minimization problem in video decoding—i.e., developing an encoding algorithm that achieves both high video quality and low decoding complexity while satisfying the bit rate constraint. The object is to reduce the complexity requirement of emerging video codecs, such as H.264, particularly on resource-limited devices such as handheld devices. The present invention is different from the approaches described above in that the present invention modifies the video encoding algorithm to minimize the required complexity at the decoder, not the encoder. The approach does not require substantial modification to existing decoder implementations. The present invention may be implemented such that it modifies the non-normative parts of, e.g., the H.264 encoding algorithm, such that it is compatible with standards-compliant decoders. However, the present invention is not limited to H.264, but may be implemented in accordance with any video encoding/decoding system, including systems operating in accordance with the MPEG-4 standard, the Motion Compensated Embedded Zero Block Coding ("MC-EZBC") standard, and others.

Additionally, other techniques for the decoder power minimization, such as those discussed above, are complementary and can be used in conjunction with the present invention. Notably, the exemplary system as described herein below may be implemented in accordance with the H.264 protocol. However, the present invention is not limited to H.264, but may be implemented in accordance with any video encoding/decoding system, including systems operating in accordance with the MPEG-4 standard and the Motion Compensated Embedded Zero Block Coding ("MC-EZBC") standard.

By way of background, generally, when considering the decoder's complexity during video encoding, the optimization problem is formulated as follows.

$$\min_P D(P) \text{s.t.}, \ R(P) \leq R_T C(P) \leq C_T \quad (2)$$

where C is the computational complexity at the decoder. Compared with the problem defined in Equation (1), a constraint on computational complexity is explicitly added. The solution for Equation (2) generally determines the best control variables, P, for each coding unit. Similar to the case for Equation (1), the control variables include quantization parameter, block mode of the motion compensation process, and the associated motion vectors.

Among the control variables, the motion vectors have the largest impact on the decoding complexity. Motion vectors can be of integer or fractional values corresponding to a displacement distance of integral pixels or fractional pixels. When a motion vector is of a sub-pixel value, multi-tap filtering is required to compute interpolation to form a reference block that is needed in the motion compensation process in the decoder. Such interpolation filtering involves huge computational cost and typically significantly increases the overall decoding complexity (the interpolation component constitutes about 50% of the decoding complexity). Although for mobile multimedia applications there are other power consuming components like wireless communication, display, and memory access, the decoding process is typically a significant one. Therefore improving the cost associated with the interpolation process is important for implementing a low-power decoding system, either in hardware or software.

In accordance with an exemplary embodiment of the present invention, the conventional rate-distortion framework is extended based on the Lagrange optimization method to incorporate the computational complexity. To estimate the complexity associated with different types of motion vectors, models are used to approximate the implementation cost involved in the interpolation filtering process.

In addition, in accordance with an exemplary embodiment of the present invention, the rate control algorithm may be extended to handle the joint rate-complexity control issue so that both the targets of rate and complexity can be met. This optimization method intelligently selects the block mode and motion vector type of each coding unit to achieve the highest video quality.

Referring now to FIG. 1, an exemplary diagram for a typical hybrid motion compensation and block-transform video coding system is shown. The interior box components 10 include the decoding portion (which typically is also simulated in the encoder system for rate control purpose). Additional components of a companion encoder system are shown in exterior box components 20. The present invention focuses generally on improvements in the motion compensation functions 30 by way of the motion estimation and mode decision functions 40. A general discussion of video encoding/decoding principles follows herein, followed by a discussion of these principles as modified in accordance with exemplary embodiments of the present invention.

Figure 2:
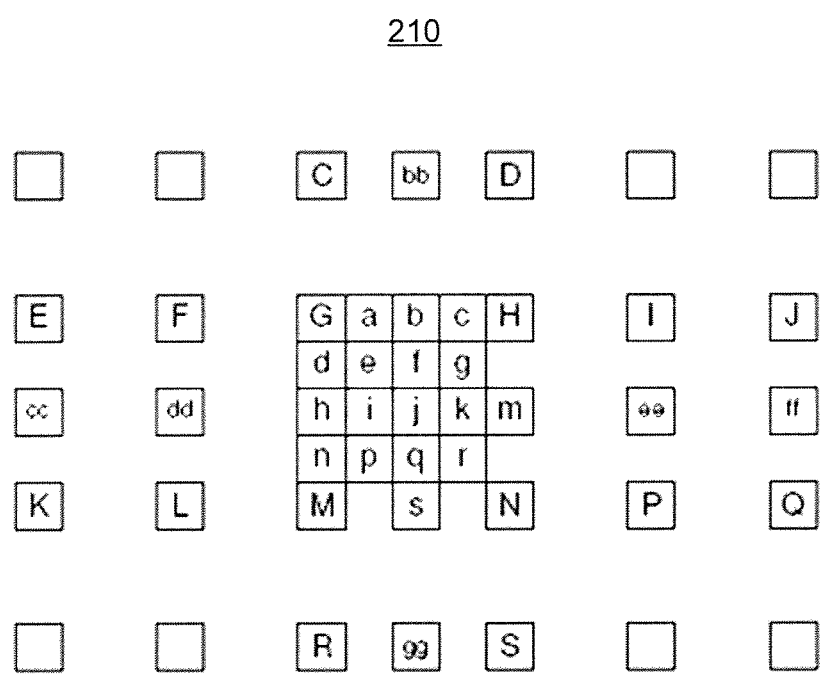

Further referring to FIG. 1, the basic decoding unit in a video decoder is a macroblock (MB), which is an array of spatially-adjacent pixels in a video sequence. For exemplary purposes, FIG. 2 is a diagram showing sub-pixel locations within a macroblock.

For each MB, the encoded bit stream may first undergo entropy decoding to obtain the syntax bits (this step is not shown in the figure, but would be known to one of ordinary skill in the art), motion vector V, and quantized coefficients $\bar{d}_T(t)$, where t is the time index of the image frame. Typical entropy codecs include variable length coding (VLC) and adaptive arithmetical coding (AAC). Inverse quantization is then employed to obtain the transform coefficient $d_T(t)$, which is further fed to an inverse transform module to reconstruct the pixel value or prediction error d(t), depending on whether intro- or inter-coded mode is utilized during encoding. For inter-coding mode, motion compensation is applied to generate the reference image $\bar{P}_R(t)$ using motion vector v and previously decoded and buffered reference image $\bar{P}(t-1)$. Motion compensation refers to the process of compensating the image displacement due to motion across frames. When the motion vector is of a sub-pixel value, interpolation is needed to compute the reference image. Lastly, by combining the prediction error d(t) and the reference image $\bar{P}_R(t)$ the decoded image of the current frame is output.

The basic concept of motion estimation is to search for an optimal block with similar values in previous coded frames as the reference signal for the block in current frame so that the encoding cost can be minimized. The optimal reference signal position is indicated by the displacement vector, called a motion vector. Motion estimation applies the basic idea of inter-frame predictive coding. Sometimes, multiple reference signals are used to form motion estimation, for example in bidirectional inter-frame prediction. Motion vectors are entropy encoded in a differential and predictive manner. (See T. Wiegand, G. J. Sullivan, G. Bjontegaard, A. Luthra, "Overview of the H.264/AVC Video Coding Standard," IEEE Trans. Circuits Syst. Video Technol., vol 13, pp. 560-576. July 2003, which is incorporated herein by reference).

Compared to motion estimation, motion compensation is the procedure by which the decoder extracts a reference signal from the location indicated by the motion vector. In reconstructing the reference signal, interpolation is a widely adopted technique used to improve the compensation precision when the motion vector has a sub-pixel value. The effectiveness of the sub-pixel motion compensation has been verified in H.263 and subsequent coding standards, at the cost of increasing complexity. Therefore reducing the motion compensation complexity is the most important target for improvement.

H.264 uses up to quarter pixel precision during interpolation. (See T. Wedi; H. G. Musmann, Motion- and aliasing-compensated prediction for hybrid video codingPage(s): IEEE Trans. Circuits Syst. Video Technol., vol 13, pp. 577-586. July 2003, which is incorporated herein by reference). All half-pixel locations undergo 6-tap FIR filtering horizontally and vertically, whenever any one applies. All quarter-pixel locations undergo 2-tap average filtering using integer and half pixels. For example, the following formulae are used to calculate sub pixel b and e:

$$b=((E-5F+20G+20H-5I-J)+16)/32$$

$$e=(b+h+1)/2$$

The amount of filtering varies depending on the exact location of the pixel. Referring again to FIG. 2, Table 1 below lists the possible interpolation operations and their associated complexities:

TABLE 1

Sub pixel locations and their interpolation complexities

| Sub Pixel Type | Points | Interpolation |
| --- | --- | --- |
| (0, 0) | G | No |
| (0, ½), (½, 0) | b, h | 1 6-tap |
| (0, ¼), (¼, 0), (0, ¾), (¾, 0) | a, c, d, n | 1 6-tap + 1 2-tap |
| (¼, ¼), (¼, ¾), (¾, ¼), (¾, ¾) | e, g, p, r | 2 6-tap + 1 2-tap |
| (½), (½) | j | 7 6-tap |
| (½, ¼), (¼, ½), (¾, ½), (½, ¾) | i, f, k, q | 7 6-tap + 1 Bilinear |

It is clear that different interpolation methods have quite different computing complexities. Some up-to-date video codecs may even have more complex interpolation. For example, in recent 3D scalable video coding standards such as MC-EZBC, an 8-tap floating filtering process is used to achieve high interpolation accuracy.

Given the information about the interpolation cost associated with each type of motion vector, the basic premise behind reducing the decoder complexity is to select motion vectors that involve less interpolation complexity while maintaining high video quality. An empirical analysis of some H.264 statistical data shows that depending on the video content, 40% to 80% of motion vectors are located on sub pixels with different interpolation complexities. Therefore the principal approach to complexity reduction is to change motion vectors from high complexity sub pixel positions into low complexity, or even to integer-pixel positions.

In order to further reduce the temporal redundancy and improve the efficiency of motion estimation, H.264 defines a diverse set of block mode options. Besides the conventional modes (intra, forward, backward and bidirectional), two new important modes are introduced: variable block size and SKIP/DIRECT.

First, unlike earlier coding standards which use a fixed block size (usually 16×16 or 8×8) during motion estimation, H.264 allows for partitioning of an MB into several blocks with variable block size, ranging from 16 pixels to 4 pixels in each dimension. An MB can comprise up to 16 blocks. Each block with reduced size can have individual motion vectors to estimate the local motion at a finer granularity. Though such finer block sizes incur extra overhead such as extra computation for searching and extra bits for coding the motion vectors, they allow more accurate prediction in the motion compensation process and consequently the residual errors can be considerably reduced (which is generally favorable for the final rate-distortion performance).

Secondly, the SKIP/DIRECT mode is utilized for the P/B frame in H.264 motion compensation to further increase the coding efficiency. The spatial/temporal neighbor motion vectors are used to predict the motion vector of the current block, without sending extra bits to encode the current motion vector. Details regarding the SKIP/DIRECT modes can be found in the Wiegand et al and Tourapis et al. references, cited and incorporated by reference hereinabove. In the mode decision algorithm used in accordance with the present invention, both the variable-size block mode and the SKIP/DIRECT mode may be considered during the search process.

The selection of block mode has a direct and substantial impact on the decoder computational complexity, because it determines what kind of motion vectors are recorded in the bit stream. Optimal selection of the block mode and the associated motion vectors are important problems addressed by the present invention. These steps are discussed in greater detail hereinafter.

As discussed above, conventional video coding systems generally encode a video bit stream by solving the optimization problem defined in Equation (1). The main control variables P involved in this procedure include motion vector v, block mode M and quantization parameter QP. There is complex interaction between the choices of these variables and thus the optimal solution is difficult to achieve. In practice, compromise approaches are taken and approximate solutions are often developed. For example, typically QP is determined through some empirical models and updated throughout the video sequence by some rate control algorithms. Given QP, the other variables, motion vector and block mode, are decided by applying some rate-distortion optimization process. A survey of these prior art procedures is described in G. J. Sullivan and T. Wiegand, Rate-Distortion Optimization for Video Compression IEEE Signal Processing Magazine, Vol. 15, Num. 6, pp. 74-90, November 1998, which is incorporated herein by reference. A brief background summary follows.

Specifically, for each block B with a block mode M, the motion vector associated with the block is selected through a rate-distortion joint cost function:

$$V^*(B, M) = \underset{V \in sup\{V\}}{\operatorname{argmin}} J_{MOTION}^{R,D} \qquad (3)$$

$$(V \mid B, M) = \underset{V \in sup\{V\}}{\operatorname{argmin}} \{D_{DFD}(V \mid B, M) + \lambda_{MOTION} R_{MOTION}(V \mid B, M)\}$$

where v* is the optimal motion vector, sup{V} defines the search space, whose dimensions include the prediction direction, the reference frame list and the search range. $R_{MOTION}$ is the estimated bit rate to record the motion vector. $D_{DFD}$ represents the prediction error between the current block and the reference block. Usually the sum of absolute difference (SAD) is adopted because the search space of motion vector is much larger than that of mode and SAD has lighter computation cost compared with the sum of squared difference (SSD). $J_{MOTION}^{R,D}(v)$ is the rate-distortion joint cost comprising of $R_{MOTION}$ and $D_{DFD}$.$\lambda_{MOTION}$ is the Lagrange multiplier to control the weight of the bit rate cost, relative to the signal distortion caused by the prediction error.

In a similar manner the block mode M for an MB is decided by the following.

$$M^*(MB, QP) = \underset{M \in sup\{M\}}{\operatorname{argmin}} J_{MODE}^{R,D} \qquad (4)$$

$$(M \mid MB, QP) = \underset{M \in sup\{M\}}{\operatorname{argmin}} \{D_{REC}(M \mid MB, QP) + \lambda_{MODE} R_{REC} (M \mid MB, QP)\}$$

where M* is the optimal block mode, and sup{M} is the set of block mode options (such as INTRA, SKIP, DIRECT, FORWARD, BACKWARD, BIDIRECTION, etc). A full list of block mode options in H.264 can be found in the Tourapis et al. reference, cited and incorporated by reference hereinabove. $D_{REC}$ is the SSD between the current MB and the reconstructed one through motion compensation. $R_{REC}$ is the estimated bit rate associated with mode M. $J_{MODE}^{R,D}(M)$ is the joint cost comprising of rate $R_M$ and distortion $D_M$, and $\lambda_{MODE}$ is the Lagrange multiplier. The motion vectors associated with the optimal block mode v*(B,M*) will be the final coded data recorded in the bit stream.

The Lagrange multipliers used in the above two cost functions determine the relative weights between signal quality and bit rate. To simplify the search process, an empirically derived relationship as the following is typically used in practice in the prior art. The square root relationship is partly due to the fact that SAD is used in modeling $D_{DFD}$ while SSD is used for $D_{REC}$.

$$\lambda_{MOTION} = \sqrt{\lambda_{MODE}} \quad (5)$$

Rate control (RC) is the procedure of adjusting control variables so that the target rate requirement can be achieved while optimizing the overall video quality. Given a target bit rate, the average allocated bit rate may be computed for each basic coding unit. Then the Lagrange optimization method may be used to find the optimal set of control variables. However, searching over the entire variable space is very complex. In practice, most implementations use empirical models to restrict the search space. For example, a popular method, called rate-quantization modeling, maps the target bit rate to the quantization parameter, from which the Lagrange multipliers are decided. In addition, since coding of a data unit may not result in a bit rate that exactly matches the target, a separate process, called buffer management, may be used to monitor the available bit rate budget for the remaining data units and thus update the allocated recourse. A brief discussion of these processes is provided below.

A rate-Quantization (RQ) model describes the relationship between QP and the bit rate. A widely adopted quadratic RQ model, as described in T. Chiang and Y.-Q. Zhang, "A New Rate Control Scheme Using Quadratic Rate Distortion Model," IEEE Trans. Circuits Syst. Video Technol., Vol. 7, pp. 246-250, February 1997, which is fully incorporated herein by reference, is:

$$R = D(P_1 \cdot QP^{-1} + P_2 \cdot QP^{-2}) \quad (6)$$

where D is the source complexity of the video signal, and usually measured using the motion estimation prediction errors (such as SAD), and $\{P_1, P_2\}$ are model parameters. Some systems use $P_2=0$ for simplicity. A typical RQ modeling procedure involves two major steps: model estimation and QP prediction. First several basic coding units are coded using some preset QP values. The coding units may include a certain number of MBs or one whole frame. The resulting rate-quantization-distortion (R-Q-D) points are collected. The model in Equation (6) is then estimated based on the observations. The estimated model can then be used to determine the QP value for the next coding unit based on the target bit rate $R_1$ and source complexity $D_1$ for the new unit. The former is determined by the buffer management process to be described below, and the latter is predicted using previous observations of the source complexity. Usually the source complexity is assumed to vary gradually and can be estimated using some simple relationship such as a linear model. Once coding of the new unit is completed, new observations of the R-Q-D points are collected and used to update the estimation of the RQ model in a sliding window manner. Namely, the oldest R-Q-D point is purged and the latest point is added to update the model.

The buffer management employs a virtual buffer to simulate the behavior of the data buffer on the decoder side. It is an important component in rate control in order to adjust the target bit rate for each coding unit and avoid the problem of buffer overflow or underflow. For example, given a target bit rate for the video sequence, the average bit rate allocation for each Group of Pictures (GOP) can be computed, and the allocated bit rate, $R_1$, for a new frame to be coded (such as P frame) can be determined by monitoring the actual number of bits spent on the previous frames.

In H.264, given the target rate and QP for the coding unit, the following empirical relationship is often used to determine the Lagrange multiplier needed in the rate-distortion tradeoff optimization.

$$\lambda_{MODE} = 0.85 \times 2^{\frac{QP-12}{3}} \quad (7)$$

Such an empirical model is useful to simplify the search process in the Lagrange optimization method, while practical implementations have often shown satisfactory performance. Other parameters such as $\lambda_{MOTION}$ can also be determined according to Equation (5).

The present invention is an improvement on the above procedures and provides a new system and method for complexity-adaptive motion estimation and mode decision ("CAMED"). In accordance with an exemplary embodiment of the present invention, given defined metrics for signal distortion and computational complexity, the tradeoff between video quality and resource consumption (both bit rate and computational complexity) may be considered to approximate the optimal motion vectors and block mode used in the motion compensation process in the decoder, thereby reducing decoding complexity and power consumption.

A system and method of the present invention may consist of several sub-components: a rate-distortion-complexity ("R-D-C") joint optimization framework, a complexity cost function, and a complexity control algorithm. The R-D-C framework extends the previously discussed Lagrange optimization framework to incorporate the complexity term. The complexity cost function provides quantitative measurements of the required computation for each motion vector type. The complexity control algorithm is used to control the complexity over different coding units to meet the overall target complexity.

The present invention provides a solution to the problem defined in Equation (2), with an explicit Lagrange term to model the complexity cost. Therefore, in accordance with an exemplary embodiment of the present invention, the motion vectors may be selected through a rate-distortion-complexity joint cost function as follows:

$$V_C^*(B, M) = \underset{V \in sup\{V\}}{\operatorname{argmin}} J_{MOTION}^{R,D,C} \quad (8)$$

$$(V | B, M) = \underset{V \in sup\{V\}}{\operatorname{argmin}} \{J_{MOTION}^{R,D}(V | B, M) + \gamma_{MOTION} C_{MOTION}(V | B, M)\}$$

where $C_{MOTION}$ is the complexity cost function associated with the selected motion vector (V|B,M), $\gamma_{MOTION}$ is the Lagrange multiplier for the complexity term, $J_{MOTION}^{R,D}(v)$ is the rate-distortion joint cost function defined in Equation (3), and $J_{MOTION}^{R,D,C}(v)$ is the rate-distortion-complexity joint cost function.

Similar to the earlier case described in Equation (4), the block mode search process of the present invention may be performed according to the following.

$$M_C^*(MB, QP) = \underset{M \in sup\{M\}}{\operatorname{argmin}} J_{MODE}^{R,D,C} \quad (9)$$

$$(M | MB, QP) = \underset{M \in sup\{M\}}{\operatorname{argmin}} \{J_{MOTION}^{R,D}(M | MB, QP) + \gamma_{MODE} C_{MODE}(M | MB)\}$$

where $C_{MODE}$ is the complexity cost function associated with the block mode, $\gamma_{MODE}$ is the Lagrange multiplier, $J_{MODE}^{R,D}(v)$ is the rate-distortion joint cost function defined in (4), and $J_{MODE}^{R,D,C}(v)$ is the rate-distortion-complexity joint cost function.

The effect of $\gamma_{MODE}=0$ is apparent in view of the above. When $\gamma_{MODE}=0$, the solutions of Equations (8) and (9) are identical with the ones in Equations (3) and (4), namely no consideration is given to the complexity constraint and many motion vectors may be of sub-pixel values in order to minimize the distortion. When $\gamma_{MODE}=\infty$, all motion vectors are forced to integer pixel locations in order to minimize the complexity involved in interpolation for sub-pixel locations. Clearly there is a tradeoff between these two extremes to balance the performance in terms of quality and complexity.

For simplification, restrictions may be adopted, like those described in Equation (5), to limit the search space. For example, the following relationship may be used to link $\gamma_{MODE}$ and $\gamma_{MOTION}$:

$$\gamma_{MOTION} = \sqrt{\gamma_{MODE}} \qquad (10)$$

In the joint cost function described above, a quantitative model may be used to estimate the complexity associated with each candidate motion vector and block mode. As discussed above, the computational complexity is heavily influenced by the type of the motion vector (integer, half-pixel, or quarter-pixel) and the interpolation filters used in the motion compensation process. Focusing on the interpolation filtering cost, quantitative estimates of such complexities can be approximated by the number of filtering operations needed in interpolation, such as those listed in Table 1. For example, using the same 6-tap filter and 2-tap filter implementations, the complexity of each motion vector type is as follows.

$$C_B(V) = N_B \cdot c_p(V) \qquad (11)$$

$$c_p(V) = \begin{cases} 0 & V \text{ is integer } MV \\ e_6 & V \text{ is subpixel } b, h \\ e_6 + e_2 & V \text{ is subpixel } a, c, d, n \\ 2e_6 + e_2 & V \text{ is subpixel } e, g, p, r \\ 7e_6 & V \text{ is subpixel } j \\ 7e_6 + e_2 & V \text{ is subpixel } i, f, k, q \end{cases} \qquad (12)$$

where $c_B(v)$ is the computational cost for the current coding block, $V$ is the motion vector, $c_P(V)$ is the computational complexity required for calculating a reference pixel, $N_B$ is the number of pixels in the current coding block, and $\{e_6, e_2\}$ are the estimated complexities for 6-tap and 2-tap interpolation respectively. Experimental results indicate that a simplified model ignoring the 2-tap interpolation will mostly result in the same selection of the motion vectors. With such simplification, the above model may be reduced to the following with a common factor $e_6$ removed.

$$c_p(V) = \begin{cases} 0 & \text{integer } MV \\ 1 & \text{subpixel } a, b, c, d, h \ \& \ n \\ 2 & \text{subpixel } e, g, p, r \\ 7 & \text{subpixel } i, j, f, k, q \end{cases} \qquad (13)$$

Equations (11) and (13) may be used to estimate the computational complexity based on the interpolation operation—these models provide platform-independent modeling. Alternatively, the complexity cost may be derived from specific software or hardware implementations (platform-dependant modeling). The following are two examples of platform-dependent modeling in accordance with exemplary embodiments of the present invention.

The complexity cost functions defined in Equation (11) and (13) are also considered to be pixel-based in that the complexity is calculated for each pixel independently without considering the reusability of previous calculated pixel (or sub pixel) values. For block-based motion compensation as adopted in H.264, some interpolations can be saved by directly using previous computed results. Again according to the H.264 standard description, the following categories of sub pixels may be considered:

For integer pixel no interpolation is necessary, and the complexity is zero;

For sub pixels a, b, c, d, h and n, they are located in either integer row or integer column, only one 6-tap filtering is necessary for them.

Considering a 4×4 block (the minimum MC unit in H.264), the complexity is 1×16=16;

For sub pixels e, g, p and r, similar to previous case, the complexity is 2×16=32;

For sub pixels i, j, f k and q, on each column within a 4×4 block, the topmost sub pixel requires full 7 6-tap interpolations. Whereas for each of the remaining three sub pixels located in the same column, 5 6-tap interpolations calculating its upper sub pixel value can be reused and only two additional 6-tap interpolations are necessary. Therefore, the complexity is 7×4+2×12=52.

Therefore, block-based complexity may be modeled as (after value scaling):

$$C_p(V) = \begin{cases} 0 & V \text{ is integer } MV \\ 4 & V \text{ is subpixel } a, b, c, d, h \text{ and } n \\ 8 & V \text{ is subpixel } e, g, p, r \\ 13 & V \text{ is subpixel } i, j, f, k, q \end{cases} \qquad (14)$$

The model in Equation (14) above can even be further fine tuned considering variable block size implementation during MC, in accordance with the lookup table below:

TABLE 2

Lookup table for complexity cost using variable block size MC implementation

| Mode | Integer | 1 6-tap | 2 6-tap | 7 6-tap |
|---|---|---|---|---|
| SKIP/DIRECT | 0 | 256 | 512 | 592 |
| 16 × 16 | 0 | 256 | 512 | 592 |
| 16 × 8 | 0 | 128 | 256 | 296 |
| 8 × 16 | 0 | 128 | 256 | 296 |
| 8 × 8 | 0 | 64 | 128 | 168 |
| 8 × 4 | 0 | 32 | 64 | 84 |
| 4 × 8 | 0 | 32 | 64 | 84 |
| 4 × 4 | 0 | 16 | 32 | 52 |
| Intra | 0 | 0 | 0 | 0 |

In an exemplary hardware implementation of an embodiment of the present invention, each interpolation operation can be divided into a number of basic operators such as addition, shifts, and/or multiplications. In this case, $\{e_6, e_2\}$ can be modeled with more detail, such as:

$$e_i = \sum_j \rho N(o_j) P(o_j), \; i = 2, 6 \qquad (15)$$

where $o_j$ is the basic operator involved in the interpolation implementation, $N(o_j)$ is the required number of operator $o_j$, $P(o_j)$ is the power consumption of operator $o_j$, and $p \geq 1$ is the adjustment factor to consider additional power cost such as memory access. For instance, a hardware implementation of interpolation \ was introduced in T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004, which is fully incorporated herein by reference. Its estimated complexity is $$e_6 = P(6P_{add} + 2P_{shift}) \qquad (16)$$

where $P_{add}$, $P_{shift}$ are the power consumption for the addition operator and the 2-bit shift operator respectively.

Each block may be associated with multiple reference blocks, each of which needs a motion vector. For example, for bidirectional prediction, each block may need two motion vectors for forward and backward prediction respectively. Thus, the computational cost for a block B with the block mode M is calculated as:

$$C_{MOTION}(V \mid B, M) = \sum_j (c_B(V_j, M, B)) \qquad (17)$$

where the summation is over each reference block.

Each MB may consist of several smaller blocks, depending on the block mode, M. The overall computational cost associated with a MB and a block mode can be calculated as:

$$C_{MODE}(M \mid MB) = \sum_i \sum_j (c_B(B_i, V_j, MB)) \qquad (18)$$

where i is the index of the individual blocks contained in the MB, and j is the index for multiple motion vectors associated with a single block. Equations (17) and (18) are generic and applicable to all inter-coded block modes, including foreword/backward/bi-directional motion compensation and SKIP/DIRECT.

Equations (8) and (9) use the Lagrange multiplier to formulate R-D-C combined optimization problems. Assuming that the selection of motion vector and block mode for a certain MB is independent of behaviors in other MBs (which is a reasonable approximation of the real case), at the optimal solution each MB will have the same Lagrange multiplier ($\gamma_{MOTION}$, $\gamma_{MODE}$). This is an important property of the Lagrange multiplier. In other words, given a specific $\hat{\gamma}_{MODE}$ and considering Equation (10), the bit stream with complexity $C(\hat{\gamma}_{MODE})$ can be derived. This $\hat{\gamma}_{MODE}$ is (approximately) the optimal solution for the following problem:

$$\min_{\{V, M\}} \sum_{i=1}^{N} J^{R,D}(V_i, M_i) \; s.t., \; \sum_{i=1}^{N} C(V_i, M_i) \leq C(\hat{\gamma}_{MODE}) \qquad (19)$$

where $\vec{V} = (V_1, V_2 \ldots V_N)$ and $\vec{M} = (M_1, M_2 \ldots M_N)$ are the motion vectors and block modes for all MBs respectively, $V_i$ and $M_i$ are the motion vector and block mode for $i^{th}$ MB respectively, $J^{R,D}$ is the R-D cost function, and C(V, M) is the complexity cost function. Unfortunately, the complexity level $C(\hat{\gamma}_{MODE})$ associated with $\hat{\gamma}_{MODE}$ cannot be known in advance unless the bit stream has been encoded. Therefore, the Lagrange multiplier has to be adjusted in order to match certain target complexity level. This procedure implemented in the context of the present invention is referred to as "complexity control."

Complexity control, analogous to the rate control process described above, is a process to allocate the complexity resource among the coding units and to determine parameters like Lagrange multiplier $\gamma_{MODE}$ to be used in the optimization procedure. In the exemplary embodiment of the present invention described above, the allocated bit rate is mapped to the quantization parameter, which in turn is used to find the Lagrange multiplier $\lambda_{MODE}$. In the following exemplary embodiment of the present invention, two components of the complexity control algorithm are described—complexity modeling and buffer management. The former is used to characterize the relationship between the target complexity and the Lagrange multiplier $\gamma_{MODE}$. The latter is for monitoring the complexity usage and updating the available computational resource for each new data unit.

In complexity control a feasible modeling of complexity and control parameters ($\gamma_{MODE}$ in this case) is necessary. One of the objectives of this modeling is to identify the relationship between the target complexity and the optimization control parameter, $\gamma_{MODE}$. Based on experimentation, there is an approximately linear relationship between the complexity value and log of the Lagrange multiplier, and the type of the frame (B or P) greatly influences this relationship.

A reasonable model based on these observations is as follows:

$$C(\gamma_{MODE}) = D(K_1 \ln(\gamma_{MODE}) + K_0) \qquad (20)$$

where C is the complexity, D is a factor measuring the video source complexity similar to that used in Equation (6) for rate control. $K_1$, $K_0$ are the model parameters obtained during the coding procedure. Due to different coding mechanism, P and B frames will have distinguished model parameters and may need to be handled separately.

The above model is driven by empirical simulation observations. The linear dependence of the computational complexity on the signal source complexity is also intuitive—the more complex the signal source is, the higher the accuracy required to estimate the motion vector, and thus there is a larger gain in using sub-pixel motion vectors, resulting in an increased computational cost.

Using this model, the Lagrange multiplier $\gamma_{MODE}(t)$ for the current coding unit t can be determined by the following:

$$\gamma_{MODE}(t) = \exp\left\{ \frac{C(t) - K_0 D(t)}{K_1 D(t)} \right\} \qquad (21)$$

where C(t) is the allocated computational budget and D(t) is the predicted complexity measurement for unit t. In practice, in order to avoid large quality fluctuation, the change rate of $\gamma_{MODE}(t)$ may be bounded by some thresholds.

Figure 3:
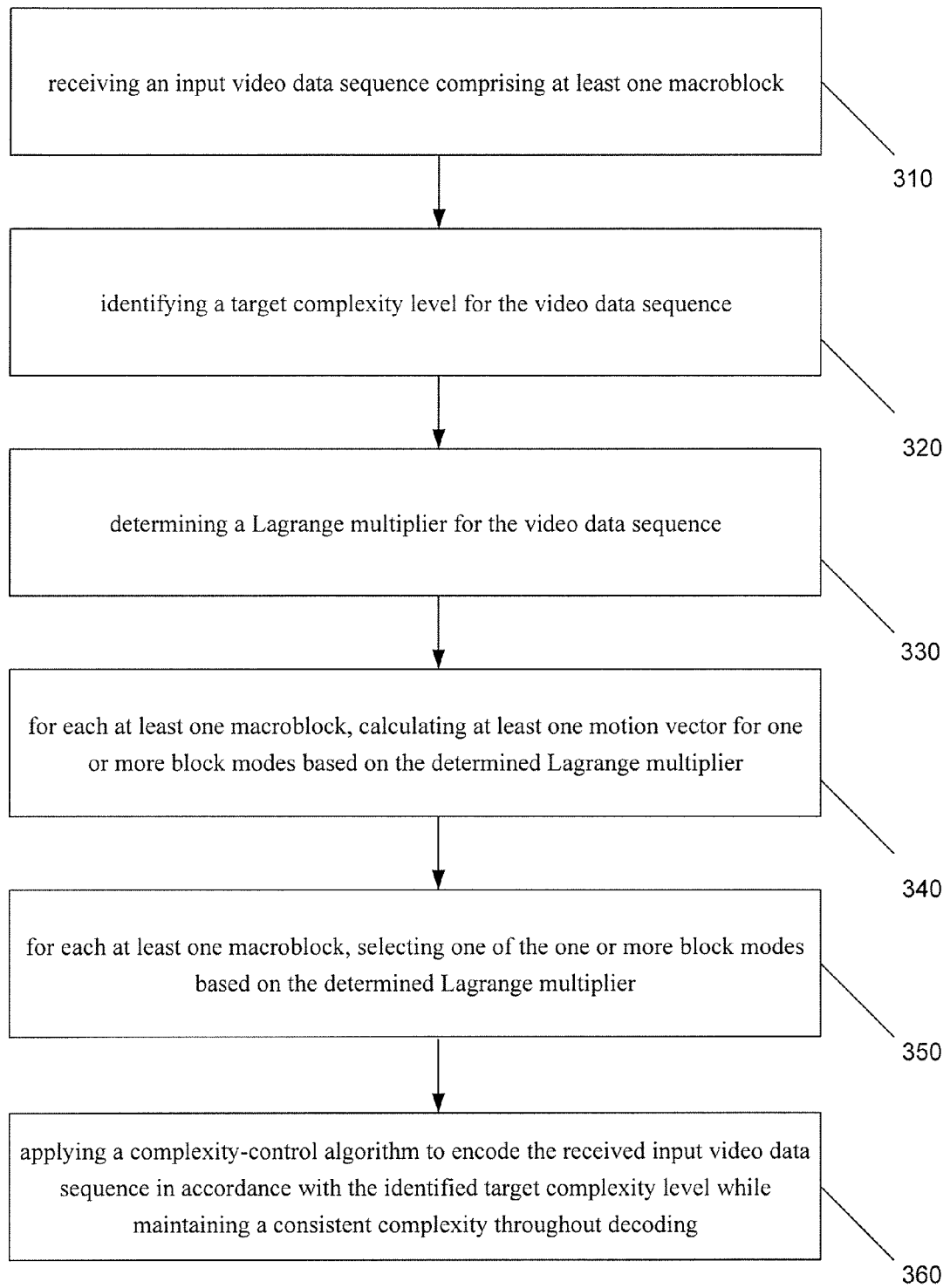
FIG. 3 is a flow chart describing the steps of a method in accordance with an exemplary embodiment of the present invention.

Referring now to FIG. 3, a flow chart for a method for optimizing the selection of motion vectors and motion compensation block modules in a video decoder in accordance with the above-described present invention is shown. In step 310, an input video data sequence is received. Next, in step 320, a target complexity level for the video decoder is determined. Then, in step 330, a Lagrange multiplier is determined. Next, in step 340, for each macroblock, a motion vector is calculated for one or more of the H.264 block modes. This may preferably be performed for every block mode available in H.264 (or the applicable video standard). Next, in step 350, for each macroblock, a best block mode is selected, based on the Lagrange multiplier. Finally, in step 360, a complexity-control algorithm, as described in detail above, is applied to encode the received input video data sequence in accordance with the identified target complexity level, such that, upon decoding, a consistent complexity level is maintained throughout decoding.

Figure 4:
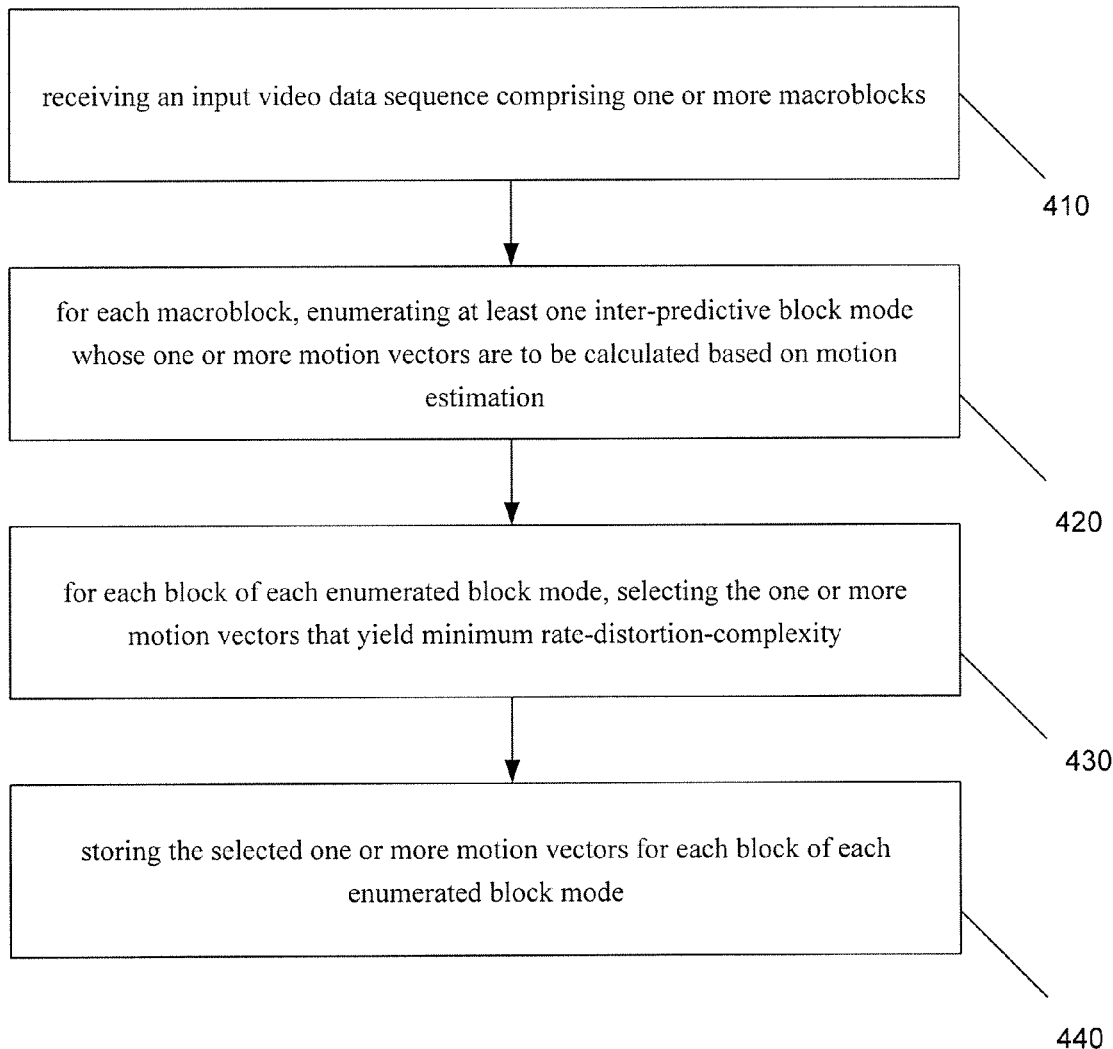
FIG. 4 is a flow chart describing the steps of a method in accordance with an exemplary embodiment of the present invention.

Referring now to FIG. 4, a flow chart for another method in accordance with the above-described present invention for selecting motion vectors in an optimized video decoder is shown. In step 410, an input video data sequence comprising one or more macroblocks is received. In step 420, for each macroblock, at least one inter-predictive block mode is enumerated. In step 430, for each block of each enumerated block mode, one or more motion vectors that yields the minimum rate-distortion-complexity is selected. Finally, in step 440, the selected one or more motion vectors is stored.

Figure 5:
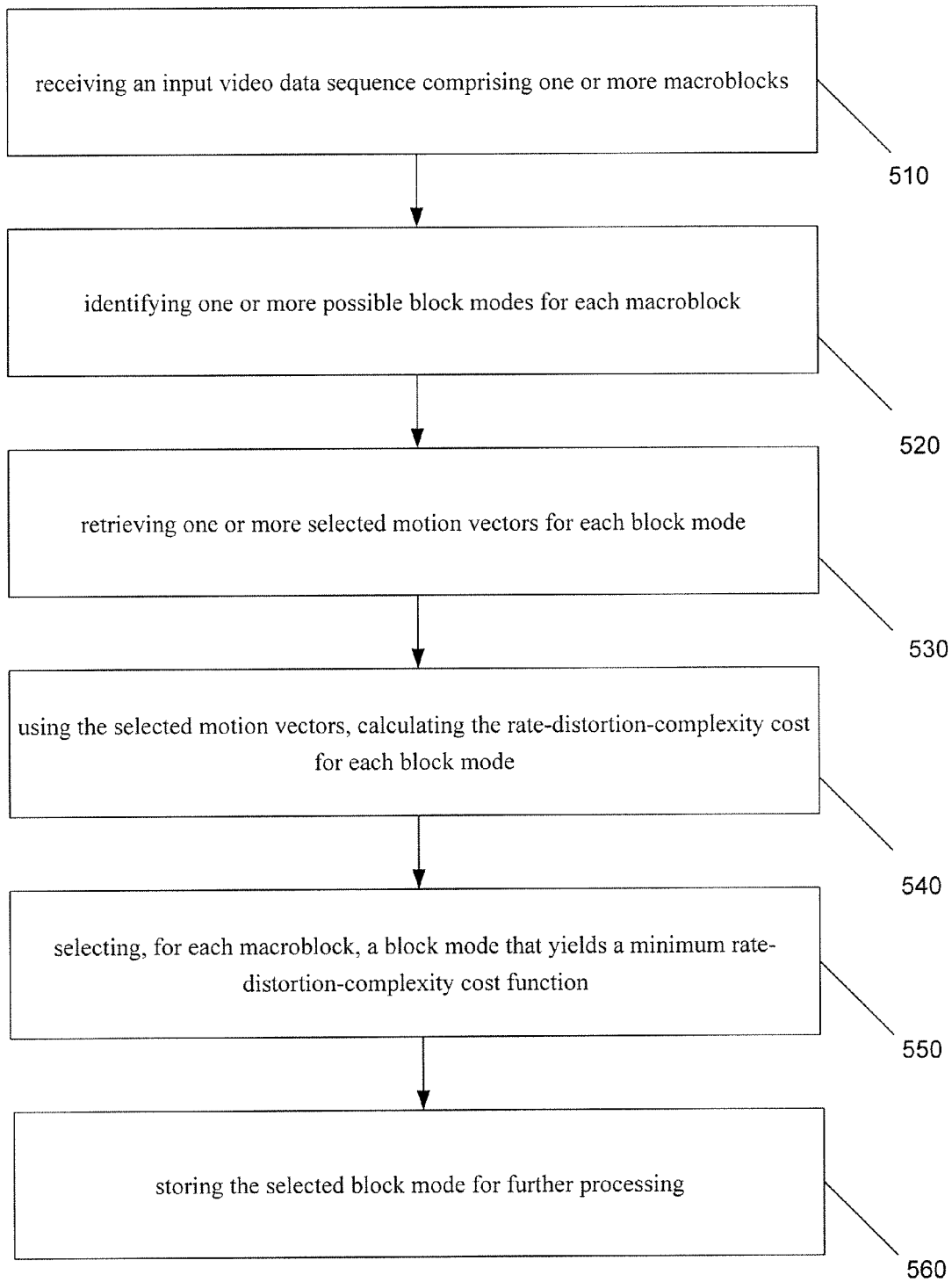
FIG. 5 is a flow chart describing the steps of a method in accordance with an exemplary embodiment of the present invention.

Referring now to FIG. 5, a flow chart for another method in accordance with the above-described present invention for selecting a block mode in an optimized video decoder is shown. In step 510, an input video data sequence is received. Next, in step 520, one or more possible block modes for each macroblock is selected. In step 530, one or more motion vectors for each block mode is received. A rate-distortion-complexity cost for each block mode is then calculated in step 540. In step 550, for each macroblock, a block mode is selected that yields a minimum rate-distortion-complexity cost function. Finally, in step 560, the selected block mode is stored for further processing.

In accordance with an exemplary embodiment of the present invention, a complexity buffer may also be implemented. A complexity buffer is a virtual buffer used to simulate the complexity usage status on the decoder side. It is analogous to the rate buffer used in the rate control to update the estimation of available resources and avoid issues of buffer overflow or underflow. Denoting CGOP the remaining complexity budget in one GOP, $N_P$, $N_B$ the remaining numbers of P, B frames respectively, and $\eta$ the complexity ratio between P and B, which is updated during video coding, the target complexity levels for P, B frame $C_P$, $C_B$ may be calculated using the following equations:

$$\frac{C_B}{C_P} = \eta \quad (22)$$

$$N_P C_P + N_B C_B = C_{GOP} \quad (23)$$

Once $C_P$, $C_B$ are available, $\gamma_{MODE}(t)$ is determined using the models and techniques described above. The formulations in Equations (22) and (23) assume the basic coding unit as one frame. It can be easily extended to smaller units for a finer granularity.

Notably, experiments involving an exemplary implementation of the present invention using an H.264 codec over different video sequences, different bit rates, and different complexity levels demonstrated that up to 60% of the interpolation complexity can be saved at the decoder without incurring noticeable quality loss (within 0.2 dB). Even for challenging video clips, 33% of the complexity can be reduced with quality difference less than 0.3 dB. Accordingly, the present invention can improve video decoding systems to reliably meet target complexity requirements for a wide range of video content.

As noted previously, the exemplary system as described herein is not limited to H.264, but may be implemented in accordance with any video encoding/decoding system, including systems operating in accordance with the MPEG-4 standard, the Motion Compensated Embedded Zero Block Coding ("MC-EZBC") standard, and others. Additionally, the present invention may be implemented using software, hardware, or some combination thereof, as would be understood by one of ordinary skill in the art. The scope of the invention is not limited to any particular implementation of the inventive system and method described herein.

The foregoing merely illustrates the principles of the invention. Various modifications and alterations to the described embodiments will be apparent to those skilled in the art in view of the teachings herein. It will thus be appreciated that those skilled in the art will be able to devise numerous systems and methods which, although not explicitly shown or described herein, embody the principles of the invention and are thus within the spirit and scope of the invention.

REFERENCES

[1] T. Wiegand, G. J. Sullivan, G. Bjontegaard, A. Luthra, "Overview of the H.264/AVC Video Coding Standard," IEEE Trans. Circuits Syst. Video Technol., vol 13, pp. 560-576. July 2003.

[2] T. Wedi; H. G. Musmann, Motion- and aliasing-compensated prediction for hybrid video codingPage(s): IEEE Trans. Circuits Syst. Video Technol., vol 13, pp. 577-586. July 2003.

[3] V. Lappalainen, A. Hallapuro, and T. D. Hämäläinen, "Complexity of Optimized H.26L Video Decoder Implementation," IEEE Trans. Circuits Syst. Video Technol., vol 13, pp. 717-725. July 2003

[4] A. M. Tourapis, F. Wu, S. Li, "Direct mode coding for bi-predictive pictures in the JVT standard", ISCAS2003, vol. 2, 700-703, Thailand, 2003.

[5] G. J. Sullivan and T. Wiegand, Rate-Distortion Optimization for Video Compression IEEE Signal Processing Magazine, Vol. 15, Num. 6, pp. 74-90, November 1998

[6] T. Chiang and Y.-Q. Zhang, "A New Rate Control Scheme Using Quadratic Rate Distortion Model," IEEE Trans. Circuits Syst. Video Technol., Vol. 7, pp. 246-250, February 1997

[7] T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004

[8] X. Zhou, E. Li, and Y.-K. Chen, "Implementation of H.264 Decoder on General-Purpose Processors with Media Instructions", in Proc. of SPIE Visual Communications and Image Processing, January 2003

[9] National's PowerWise™ technology. http:/www.national.com/appinfo/power/powerwise.html

[10] Y. Eisenberg, C. E. Luna, T. N. Pappas, R. Berry, A. K. Katsaggelos, Joint source coding and transmission power management for energy efficient wireless video communications, CirSysVideo(12), No. 6, June 2002, pp. 411-424.

[11] Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS) 2001, May, 2001, Sydney, Australia.

[12] X. Lu, E. Erkip, Y. Wang and D. Goodman, "Power efficient multimedia communication over wireless channels", IEEE Journal on Selected Areas on Communications, Special Issue on Recent Advances in Wireless Multimedia, Vol. 21, No. 10, pp. 1738-1751, December, 2003

[13] H. Kim and Y. Altunbasak, "Low-complexity macroblock mode selection for the H.264/AVC encoders," IEEE Int. Conf. on Image Processing, Suntec City, Singapore, October 2004

[14] A. Ray and H. Radha, "Complexity-Distortion Analysis of H.264/JVT Decoder on Mobile Devices," Picture Coding Symposium (PCS), December 2004

[15] K. Lengwehasatit and A. Ortega, "Rate Complexity Distortion Optimization for Quadtree-Based DCT Coding", ICIP 2000, Vancouver, BC, Canada, September 2000.

[16] Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.

[17] B. Girod, A. Aaron, S. Rane and D. Rebollo-Monedero, "Distributed video coding," *Proc. of the IEEE*, Special Issue on Video Coding and Delivery, 2005.

[18] A. M. Tourapis. "Enhanced Predictive Zonal Search for Single and Multiple Frame Motion Estimation," Proceedings of Visual Communications and Image Processing 2002 (VCIP-2002), San Jose, Calif., January 2002, pp. 1069-79.

[19] H.-Y. Cheong, A. M. Tourapis, "Fast Motion Estimation within the H.264 codec," in proceedings of ICME-2003, Baltimore, Md., Jul. 6-9, 2003

[20] M. Schaar, H. Radha, Adaptive motion-compensation fine-granular-scalability (AMC-FGS) for wireless video, IEEE Trans. on CSVT, vol, 12, no. 6, 360-371, 2002.

The invention claimed is:

1. A method for optimizing the selection of motion vectors and motion compensation block modules in a video encoder comprising:
   receiving, by the video encoder, an input video data sequence comprising at least one macroblock;
   identifying, by the video encoder, a target decoding complexity level for the video data sequence;
   determining, by the video encoder, a Lagrange multiplier for the video data sequence;
   for each at least one macroblock, calculating, by the video encoder, at least one motion vector for one or more block modes based on the determined Lagrange multiplier;
   for each at least one macroblock, selecting, by the video encoder, one of the one or more block modes based on the determined Lagrange multiplier; and
   encoding, by the video encoder, the received input video data sequence in accordance with the identified target decoding complexity level by applying a complexity control algorithm to produce an encoded bitstream that can be decoded with consistent complexity.

2. The method of claim 1, wherein the received input video data is data in accordance with the H.264 standard.

3. The method of claim 1, wherein the received input video data is data in accordance with the MPEG-4 standard.

4. The method of claim 1, wherein the received input video data is data in accordance with the Motion Compensated Embedded Zero Block Coding (MC-EZBC) standard.

5. Non-transitory computer-readable media comprising a set of instructions to direct a processor to perform the steps recited in one or more of method claims 1, 2, 3 or 4.

6. The method of claim 1, further comprising:
   identifying, by the video encoder, a target data rate for the video data sequence; and
   wherein encoding, by the video encoder, the received input video data sequence further comprises applying a data rate control algorithm to produce the encoded bitstream at the target data rate.

7. The method of claim 1, wherein calculating the at least one motion vector comprises selecting the at least one motion vector based on an interpolation complexity.

8. An optimized video encoding system comprising:
   at least one processor;
   a memory coupled to the at least one processor and containing instructions which, when executed by the processor, cause the processor to perform the steps of:
      receiving an input video data sequence comprising at least one macroblock;
      identifying a target decoding complexity level for the video data sequence;
      determining a Lagrange multiplier for the video data sequence;
      for each at least one macroblock, calculating at least one motion vector for one or more block modes based on the determined Lagrange multiplier;
      for each at least one macroblock, selecting one of the one or more block modes based on the determined Lagrange multiplier; and
      encoding the received input video data sequence in accordance with the identified target decoding complexity level by applying a complexity control algorithm to produce an encoded bitstream that can be decoded with consistent complexity.

9. The system of claim 8, wherein the received input video data sequence is data in accordance with the H.264 standard.

10. The system of claim 8, wherein the received input video data sequence is data in accordance with the MPEG-4 standard.

11. The system of claim 8, wherein the received input video data sequence is data in accordance with the Motion Compensated Embedded Zero Block Coding (MC-EZBC) standard.

12. The system of claim 8, wherein the processor is further configured to:
   identify a target data rate for the video data sequence; and
   encode the received input video data sequence by further applying a data rate control algorithm to produce the encoded bitstream at the target data rate.

* * * * *